United States Patent
Meisels et al.

(10) Patent No.: US 7,941,753 B2
(45) Date of Patent: May 10, 2011

(54) COMMUNICATING APPOINTMENT AND/OR MAPPING INFORMATION AMONG A CALENDAR APPLICATION AND A NAVIGATION APPLICATION

(75) Inventors: Adrienne C. Meisels, New York, NY (US); Stephen J. Coughlin, Falls Church, VA (US)

(73) Assignee: AOL Inc., Dulles, VA (US)

( * ) Notice: Subject to any disclaimer, the term of this patent is extended or adjusted under 35 U.S.C. 154(b) by 306 days.

(21) Appl. No.: 11/618,069

(22) Filed: Dec. 29, 2006

(65) Prior Publication Data
US 2008/0086455 A1    Apr. 10, 2008

Related U.S. Application Data

(60) Provisional application No. 60/747,746, filed on May 19, 2006, provisional application No. 60/787,690, filed on Mar. 31, 2006, provisional application No. 60/789,910, filed on Apr. 7, 2006.

(51) Int. Cl.
*G06F 3/00* (2006.01)
(52) U.S. Cl. ........ 715/751; 701/200; 701/201; 701/202; 701/208; 701/209; 701/210; 715/963
(58) Field of Classification Search .................. 715/751, 715/963; 707/3; 701/200–202, 208–210
See application file for complete search history.

(56) References Cited

U.S. PATENT DOCUMENTS

| | | | |
|---|---|---|---|
| 4,301,506 A | 11/1981 | Turco | |
| 4,393,448 A | 7/1983 | Dunn et al. | |
| 4,413,322 A | 11/1983 | Foster et al. | |
| 4,528,552 A | 7/1985 | Moriyama et al. | |
| 4,546,439 A | 10/1985 | Esparza | |
| 4,570,227 A | 2/1986 | Tachi et al. | |
| 4,646,089 A | 2/1987 | Takanabe et al. | |
| 4,689,747 A | 8/1987 | Kurose et al. | |
| 4,796,189 A | 1/1989 | Nakayama et al. | |
| 4,827,419 A | 5/1989 | Selby, III | |
| 4,866,626 A | 9/1989 | Egli | |
| 4,876,651 A | 10/1989 | Dawson et al. | |
| 4,890,104 A | 12/1989 | Takanabe et al. | |
| 4,914,605 A | 4/1990 | Loughmiller, Jr. | |
| 4,926,336 A | 5/1990 | Yamada | |
| 4,937,753 A | 6/1990 | Yamada | |
| 4,954,958 A | 9/1990 | Savage et al. | |
| 4,962,458 A | 10/1990 | Verstraete | |
| 4,984,168 A | 1/1991 | Neukrichner et al. | |

(Continued)

OTHER PUBLICATIONS

International Search Report with Written Opinion for International Application No. PCT/US07/89039, dated Apr. 23, 2008, 16 pages.

(Continued)

*Primary Examiner* — Tadeese Hailu
*Assistant Examiner* — Darrin Hope
(74) *Attorney, Agent, or Firm* — Finnegan, Henderson, Farabow, Garrett & Dunner, L.L.P.

(57) ABSTRACT

According to one general aspect, a method for providing directions to an appointment location appearing in a calendar application includes identifying an appointment in a calendar application, determining a geographic location of the appointment, identifying another geographic location associated with a user of the calendar application, generating directions between the geographic location of the appointment and the geographic location of the other location, and providing the directions generated to the user.

16 Claims, 21 Drawing Sheets

U.S. PATENT DOCUMENTS

| | | | |
|---|---|---|---|
| 5,031,104 | A | 7/1991 | Ikeda et al. |
| 5,041,983 | A | 8/1991 | Nakahara et al. |
| 5,067,081 | A | 11/1991 | Person |
| 5,115,399 | A | 5/1992 | Nimura et al. |
| 5,121,326 | A | 6/1992 | Moroto et al. |
| 5,168,452 | A | 12/1992 | Yamada et al. |
| 5,170,353 | A | 12/1992 | Verstraete |
| 5,172,321 | A | 12/1992 | Ghaem et al. |
| 5,189,430 | A | 2/1993 | Yano et al. |
| 5,191,406 | A | 3/1993 | Brandestini et al. |
| 5,191,532 | A | 3/1993 | Moroto et al. |
| 5,231,584 | A | 7/1993 | Nimura et al. |
| 5,270,937 | A | 12/1993 | Link et al. |
| 5,272,638 | A | 12/1993 | Martin et al. |
| 5,274,387 | A | 12/1993 | Kakihara et al. |
| 5,293,163 | A | 3/1994 | Kakihara et al. |
| 5,353,034 | A | 10/1994 | Sato et al. |
| 5,442,557 | A | 8/1995 | Kaneko |
| 5,486,822 | A | 1/1996 | Tenmoku et al. |
| 5,557,524 | A | 9/1996 | Maki |
| 5,608,635 | A | 3/1997 | Tamai |
| 5,790,974 | A * | 8/1998 | Tognazzini ................ 455/456.5 |
| 6,052,563 | A * | 4/2000 | Macko ........................... 340/7.1 |
| 6,282,489 | B1 | 8/2001 | Bellesfield et al. |
| 6,498,982 | B2 | 12/2002 | Bellesfield et al. |
| 6,609,064 | B1 * | 8/2003 | Dean ............................ 701/213 |
| 6,678,613 | B2 * | 1/2004 | Andrews et al. .............. 701/213 |
| 6,741,188 | B1 | 5/2004 | Miller |
| 6,801,139 | B2 * | 10/2004 | Tretyak, Jr. .............. 340/995.23 |
| 6,842,696 | B2 * | 1/2005 | Silvester ...................... 701/213 |
| 6,895,329 | B1 | 5/2005 | Wolfson |
| 6,944,539 | B2 * | 9/2005 | Yamada et al. ............... 701/211 |
| 7,062,374 | B1 | 6/2006 | Walters et al. |
| 7,085,649 | B2 * | 8/2006 | Baur et al. ................... 701/209 |
| 7,373,244 | B2 * | 5/2008 | Kreft ............................ 701/207 |
| 2002/0019835 | A1 | 2/2002 | Baur et al. |
| 2002/0188603 | A1 | 12/2002 | Baird et al. |
| 2003/0001779 | A1 | 1/2003 | Mintz et al. |
| 2003/0036848 | A1 | 2/2003 | Sheha et al. |
| 2003/0191578 | A1 | 10/2003 | Paulauskas et al. |
| 2004/0260465 | A1 | 12/2004 | Tu |
| 2005/0096841 | A1 | 5/2005 | Gedik et al. |
| 2005/0096946 | A1 | 5/2005 | Janakiraman et al. |
| 2005/0165631 | A1 * | 7/2005 | Horvitz .............................. 705/7 |
| 2005/0227712 | A1 * | 10/2005 | Estevez et al. ............. 455/456.3 |
| 2006/0058952 | A1 * | 3/2006 | Cooper et al. ................ 701/208 |
| 2006/0218029 | A1 * | 9/2006 | Chin ................................. 705/8 |

OTHER PUBLICATIONS

Office Action for U.S. Appl. No. 11/618,348, mailed Jun. 3, 2008, 28 pages.

International Search Report and Written Opinion for International Application No. PCT/US07/65714, mailed Jun. 20, 2008.

Snyder, John P., "Map Projections—A Working Manual"; U.S. Geological Survey Professional Paper; 1987; U.S. Department of Interior, 383 pages.

Sherman, Chris, "Search Engine Watch: Google Launches Local for Mobile," reprinted on Sep. 11, 2006 from http://searchenginewatch.com/showPage.html?page=sew_print&id=3561956.

Guzolek, J., and Koch, E., "Real-time Route Planning in Road Networks," 1989 IEEE, pp. 165-169.

Pruitt, Scarlet, "MapQuest Goes Mobile," *PC World*, reprinted from http://www.pcworld.com/article/id,119161-page,1/article.html on Jul. 26, 2007, 3 pages.

"Yahoo! Mobile. The Internet Now Fits Your Phone," reprinted from heep://mobile.yahoo.com/;  ylt=AujFWTXXwBsSTR8Hk_P52L1bztAcJ on Jul. 26, 2007, 2 pages.

"Mobile Web Hop Online Anywhere on your Phone," reprinted from http://mobile.yahoo.com/mobileweb;_ylt=AvZP2FpcYsq1R9iZxOpUIUnntAcJ on Jul. 26, 2007, 3 pages.

"Yahoo! Go 2.0 Improved! The Internet to Go," reprinted from http://mobile.yahoo.com/go;_ylt=AqcFZ_48Qo6sCBg9mCOe6YktQcJ, on Jul. 26, 2007, 6 pages.

"MapQuest Help: What is Turn-by-Turn Navigation?," reprinted from http://help.mapquest.com/jive/entry.jspa?externalID=298&categoryIDS=35 on Jul. 26, 2007, 1 page.

Singh, Bhagat, and Naps, Thomas L., *Introduction to Data Structures*, "The Shortest Path Algorithm," West Publishing Company, 1985, pp. 215-233.

Notice of Allowance dated Aug. 10, 2005; U.S. Appl. No. 10/273,889; 4 pages.

Final Office Action dated Jan. 24, 2005; U.S. Appl. No. 10/273,889; 8 pages.

Non-Final Office Action dated Sep. 10, 2003; U.S. Appl. No. 10/273,889; 6 pages.

Non-Final Office Action dated Apr. 16, 2004; U.S. Appl. No. 10/273,889; 7 pages.

Non-Final Office Action dated Dec. 19, 2006; U.S. Appl. No. 11/328,455; 9 pages.

Final Office Action dated Jun. 26, 2007; U.S. Appl. No. 11/328,455; 7 pages.

Sherman, C., "Google Launches Local for Mobile," *SearchEngineWatch*, reprinted from http://searchenginewatch.com/showPage.html?page=3561956 on Dec. 28, 2006, 4 pages.

* cited by examiner

200A

Calendar Services for Navigation Application

Your current location appears to be at (Home).

Your first appointment is with Dr. X at 10:00 am and appears to be at (1425 K St. NW, 11th floor, Washington D.C. 20005).

212 —  Directions/Mapping

200B

---

Navigation Services for Calendar Application

Your current location appears to be at the first appointment location: "1425 K St. NW, 11th floor, Washington D.C. 20005."

Your second appointment is with engineers Steve and Adrienne at 12:00 pm.
Your second appointment is at America Online Inc. You have not specified an address for America Online Inc. Please specify the (address).

212 —  ☐ Directions/Mapping

Navigation Services for Calendar Application

You are on schedule.
Your current location appears to be at the second appointment location: America Online Inc.

Your third appointment is with the Examiner at 2:00 pm.

Your third appointment is at the USPTO. However, we do not have an address for the USPTO. Please specify the (address).

212 —  Directions/Mapping

200E

---

Navigation Services for Calendar Application

Your current location appears to be at (Home).

Your first appointment is with DR. X at 10:00 am.
Your first appointment appears to be at (1425 K St. NW, 11$^{th}$ floor, Washington D.C. 20005).

Your second appointment is with engineers Steve and Adrienne at 12:00 pm.
Your second appointment is at America Online Inc. You have not specified an address for America Online Inc.. Please specify the (address).

Your third appointment is with the Examiner at 2:00 pm.

Your third appointment is at the USPTO. You have not specified an address for the USPTO. Please specify the (address).

212 —  ☐ Directions/Mapping

```
Navigation Services for Calendar Application

Your current locations appears to be at the first
appointment location:  "1425 K Street, NW, Washington,
DC, 20005"

Your second appointment is with engineers Steve and
Adrienne at 12:00 p.m.  Your second appointment is at
America Online Inc.

Directions/Mapping
☐ To the 2nd appointment from the first appointment
☐ To the 2nd appointment from another user selected starting location
```

212a — first checkbox
212 — group
212b — second checkbox

Navigation Services for Calendar Application

You have selected (Efficient Route Mapping) for (all) of the appointments and have specified (Home) as the starting location.

It appears you have selected the following appointments:

Your first appointment is with DR. X at 10:00 am.
    Your first appointment appears to be at (1425 K St. NW, 11<sup>th</sup> floor, Washington D.C. 2005).
    Your second appointment is with engineers Steve and Adrienne at 12:00 pm.
    Your second appointment appears to be at (2200 AOL Way Dulles, VA 20166).

The Efficient Route Mapping may rearrange the order of your appointments.
Would you like to continue?
    ☐ Yes
    ☐ No The following order of appointments are suggested:
    Your first appointment should be with engineers Steve and Adrienne at 10:00 am.
    Your second appointment should be with DR. X at 12:00 pm.

Alternative Routes

There are two alternative routes:

☐ Route 1 with 30 minutes travel time. Route 1 is configured to travel through the first appointment location first and then second appointment location.

☐ Route 2 with 20 minutes travel time. Route 2 is configured to travel through the second appointment location first and then the first appointment location.

Navigation Services for Calendar Application

Reminder  ⎡ 610

☐ Remind me at a specified (time) in advance of an appointment time to leave a first location to arrive on time at the appointment location.

☐ Remind me via telephone

☐ Remind me via email

☐ Remind me via IM

Alerts  ⎡ 620

☐ Alert me if the current road conditions changes.
　☐ Provide me with suggestions
☐ Alert me at (7:00 am everyday) about conflicting appointments.
　☐ Provide me with suggestions
☐ Alert me if there is a time period that is unscheduled between the appointments.
　☐ Provide me with suggestions
☐ Alert me if I deviate from the previously calculated route.
　☐ Provide me with new directions based on present location

Reminder Display

It is currently 9:00 am, and you are at Home.

Your first appointment is at 10:00 am, and the first appointment location is at 1425 K St. NW, 11th floor, Washington D.C. 2005.

Under (normal) conditions, it would take you 30 minutes to arrive at the first appointment location.

We suggest you leave by 9:30 am to arrive at the first appointment location on time.

Directions/maps to the first appointment location

Alert Display

It is currently 1:00 pm, and you are at the second appointment location.

Your third appointment is at 2:00 pm, and the third appointment location appears to be at 1111 Goodman Rd, Alexandria, VA, 20543.

Under (normal) conditions, it would take you 30 minutes to arrive at the third appointment location.

However, it appears following conditions have been detected:
    There is a heavy traffic due to an accident on the I-495.

Now, it will take you 1 hour to arrive at the third appointment location.

We suggest you leave now in order to arrive on time at the third appointment location, and you should take a different route than the previously calculate route to arrive at the third appointment location.

Please (view) the updated route.

Alert Display

It is currently 7:00 am, and you are at Home.

We notice your first appointment at 10:00 am is supposed to last for at least 90 minutes, and your second appointment is at 12:00 pm. We also notice that it takes 45 minutes to arrive at the third appointment location from the second appointment location.

What would you like to do:
- ☐ Spend less time at the first appointment.

- ☐ Cancel or reschedule the (second appointment).

Alert Display

It is currently 11:00 am, and it seems that you have deviated from the original route. You are presently at "McDonald's" restaurant located at 1100 F St., NW, Washington D.C. 20005.

Your second appointment is at 12:00 pm, and the second appointment location appears to be at 2200 AOL Way Dulles, VA 20166.

Under (normal) conditions, it would take you 10:00 minutes to arrive at the second appointment location.

What would you like to do until 11:50 am:
- ☐ Spend more time at the McDonald's restaurant (snooze)
- ☐ Stop at a gas station.
- ☐ Start traveling toward the next appointment.
- ☐ Other activities.
- ☐ Locate a (coffee shop) near (Destination 1)

COMMUNICATING APPOINTMENT AND/OR MAPPING INFORMATION AMONG A CALENDAR APPLICATION AND A NAVIGATION APPLICATION

CROSS REFERENCE TO RELATED APPLICATIONS

The present application claims priority from U.S. Provisional Application No. 60/789,910, filed Apr. 7, 2006, U.S. Provisional Application No. 60/787,690, filed Mar. 31, 2006, and U.S. Provisional Application No. 60/747,746, filed May 19, 2006. The contents of the prior applications are incorporated herein by reference in their entirety.

TECHNICAL FIELD

This present application relates to communicating appointment and/or mapping information among a calendar application and a navigation application.

BACKGROUND

A user may populate an electronic calendar with appointments that take place at different locations. The calendar may be, for example, a Microsoft Outlook calendar, and may be manually programmed to include a date and time of appointments and locations associated with the appointments.

A user also may access mapping applications, manually inputting an address or other indicia of location to derive maps.

SUMMARY

According to one general aspect, a method for providing directions to an appointment location appearing in a calendar application includes identifying an appointment in a calendar application, determining a geographic location of the appointment, identifying another geographic location associated with a user of the calendar application, generating directions between the geographic location of the appointment and the geographic location of the other location, and providing the directions generated to the user.

Implementations of the above general aspect may include one or more of the following features. For example, identifying the appointment may further include accessing the calendar application via another application and identifying the appointment in the calendar application.

The other application may include a navigation application and accessing the calendar application may include accessing the calendar application in response to activation of a transferring control tool within the navigation application, that is configured to import the appointment and the geographic location associated therewith into the navigation application. The transferring control tool may include an import icon appearing in an interface of the navigation application.

Alternatively or additionally, identifying the appointment may further include accessing the calendar application via a client device and identifying the appointment in the calendar application. The method also may include communicating the appointment to a navigation application. The method also may include rendering a transferring control tool within an interface of a calendar application. Identifying the appointment may include identifying the appointment in response to the activation of the transferring control tool that is configured to export the appointment and the geographic location associated therewith into the navigation application. The transferring control tool may include an export icon appearing within the interface of the calendaring application.

Identifying the other geographic location associated with the user may include identifying a current location of the user. Identifying the current location of the user may include identifying the current location of the user based on a location based technology implemented in a client device of the user. The client device may be enabled with a global positioning system.

In one implementation, identifying the appointment in the calendar application may include identifying a first appointment. Identifying the other geographic location associated with the user may include identifying a second appointment in the calendar application and determining a geographic location of the second appointment based on location information associated with the second appointment. And, generating directions may include generating directions between the geographic location of the first appointment and the geographic location of the second appointment. The method also may include identifying a starting location and an ending location. To this end, generating directions may include generating a route that begins at the starting location, ends at the ending location, and passes through the geographic location of the first appointment and then through the geographic location of the second appointment. The first appointment may take place earlier in time than the second appointment.

Generating directions further may include generating a route that begins at the ending location, ends at the starting location, and passes through the geographic location of the second appointment and then through the geographic location of the first appointment.

Identifying the first appointment may include identifying an ending time associated with the first appointment and identifying the second appointment may include identifying a starting time associated with the second appointment. The method also may include subtracting the ending time from the starting time to identify a length of time between the first appointment and the second appointment, identifying a travel time associated with a route from the first geographic location of the appointment to the geographic location of the second appointment, comparing the travel time to the length of time, and based on the result of comparison, providing a message to the user. Providing the message may include providing an alert message if it is determined that the travel time exceeds the length of time, thus, alerting the user that, based on the current scheduling of the first and second appointments, the user would not have enough time to arrive at the second appointment location. Alternatively or additionally, providing the message may include providing a message that informs the user of an unscheduled time period in the calendar application if it is determined that the travel time is less than the length of time by more than a default amount.

The method also may include providing one or more suggestions to enable the user to respond to the alert message. The one or more suggestions may include a suggestion to leave the first appointment sooner than the scheduled ending time or to cancel or reschedule the first or second appointment.

Identifying the first appointment may include identifying an ending time associated with the first appointment and identifying the second appointment may include identifying a starting time associated with the second appointment. The method also may include identifying a travel time associated with a route from the geographic location of the first appointment to the geographic location of the second appointment and displaying a notification window at a specified time that precedes the starting time of the second appointment time by at least the travel time to the second appointment, the notification window structured and arranged to remind the about the second appointment. The specified time may include a user-defined time.

Generating directions may include generating a first route configured to travel from the geographic location of the first appointment to the geographic location of the second appointment and generating directions may include generating a second route configured to travel from the geographic location of the second appointment to the geographic location of the first appointment. The method also may include identifying the travel time associated with the first route and the second route, comparing the travel time associated with the first route with the travel time associated with the second route, determining whether the travel time associated with the second route is less than the travel time associated with the first route, and if it is determined that the travel time associated with the second route is less than the travel time associated with the first route, selecting the second route for display to the user.

Determining the geographic location of the appointment may include determining the geographic location of the appointment by accessing the location information appearing in the calendar application for the appointment. Alternatively or additionally, determining the geographic location of the appointment may include determining the geographic location of the appointment by using the appointment information appearing in the calendar application to search for the geographic location. The method also may include identifying the geographic location of the appointment, as a result of searching for the geographic location, and requesting the user of the calendar to confirm the geographic location of the appointment.

Identifying the appointment in the calendar application may include identifying an ending time associated with the appointment, and identifying another geographic location may include identifying a subsequent appointment that is scheduled to take place after the appointment and identifying a starting time associated with the subsequent appointment. The method also may include subtracting the ending time from the starting time to identify a length of time between the appointment and the subsequent appointment, identifying a travel time associated with a route from the appointment to the subsequent appointment, comparing the travel time to the length of time, and based on the result of comparison, providing a message to the user.

According to another general aspect, a method for providing directions to an appointment location appearing in a calendar application includes rendering a transferring control as a tool within an interface associated with either a calendar application or a navigation application, the transferring control structured and arranged to communicate appointment information from the calendar application to the navigation application and enabling a user to activate the transferring control. In response to the activation of the transferring control, the method includes identifying a location associated with an appointment appearing in the calendar application, transferring an identifier, identifying the appointment and the location associated with the appointment to the navigation application, generating directions between the location associated with the appointment and a starting location, and displaying the directions within a user interface associated with the navigation application or the calendar application.

Implementations of the above general aspect may include one or more of the following features. For example, rendering the transferring control may include rendering the transferring control within the interface associated with the calendar application, the transferring control structured and arranged to export the appointment information from the calendar application to the navigation application. Transferring may include exporting the identifier to the navigation application, wherein the identifier includes a description of the appointment and the location associated therewith.

Alternatively or additionally, rendering the transferring control may include rendering the transferring control within the interface associated with the navigation application, the transferring control structured and arranged to import the appointment information from the calendar application to the navigation application. Enabling the user to activate the transferring control further may include enabling the user to access the navigation application, enabling the user to identify the calendar application to the navigation application, and enabling the user to select the transferring control within the interface associated with the navigation application. Transferring may include importing the identifier to the navigation application. The identifier may include a description of the appointment and the location associated therewith. Importing the identifier also may include accessing, via the navigation application, the user-identified calendar application, accessing, within the calendar application, the identifier of the appointment, and pulling the identifier into the navigation application.

The method also may include displaying a notification window before an appointment time, the notification window structured and arranged to remind the user about the appointment. Rendering the transferring control may include rendering the transferring control within the notification window, such that selection of the transferring control results in transfer of the appointment description and the location associated with the appointment to the navigation application. Displaying the notification window may include displaying the notification window in a specified time in advance of the appointment time. Displaying the notification window in the specified time in advance of the appointment time further may include identifying a travel time to the appointment location from the starting location and displaying the notification window at a specified time that precedes the appointment time by at least the travel time to the appointment location.

Transferring may include transferring the identifier to the navigation application in a specified time in advance of an appointment time. The identifier may include a description of the appointment and the location associated therewith. Generating the directions may include generating a travel route from a first location to the location associated with the appointment.

Alternatively or additionally, generating the directions may include determining an efficient route for multiple appointments having an arbitrary order, arranging the order of the multiple appointments based on the efficient route, and generating directions through locations associated with the multiple appointments based on the arranged order of the multiple appointments.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 2B illustrates an exemplary user interface used to generate directions for a user traveling from a first appointment location to a second appointment location.

FIG. 2E illustrates an exemplary user interface used to generate directions for a user traveling from a starting location through locations associated with the appointments in a calendar application.

FIG. 2F illustrates an exemplary user interface giving a user an option to obtain directions from a user-selected location to the user's next appointment location.

FIG. 5A illustrates an exemplary user interface presented to a user in response to the user's electing to use efficient route mapping.

FIG. 5C illustrates an exemplary user interface presented to a user that allows the user to select from among identified alternative routes.

FIG. 6 illustrates an exemplary user interface that enables a user to set a reminder message and an alert message.

FIG. 7 illustrates an exemplary user interface used to remind a user about the user's appointment.

FIG. 8B illustrates an exemplary user interface that may be generated as a result of the process illustrated in FIG. 8A and presented to the user to alert a user about a change in current road conditions.

FIG. 9B illustrates an exemplary user interface that may be generated as a result of the process illustrated in FIG. 9A to alert a user about conflicting appointments.

FIG. 10B illustrates an exemplary user interface that may be generated as a result of the processes illustrated in FIGS. 10A and 9A to alert a user that the user has deviated from an original route, that an unscheduled time period has been found in the user's calendar, and that various activities are potential alternatives.

DETAILED DESCRIPTION

Figure 1:
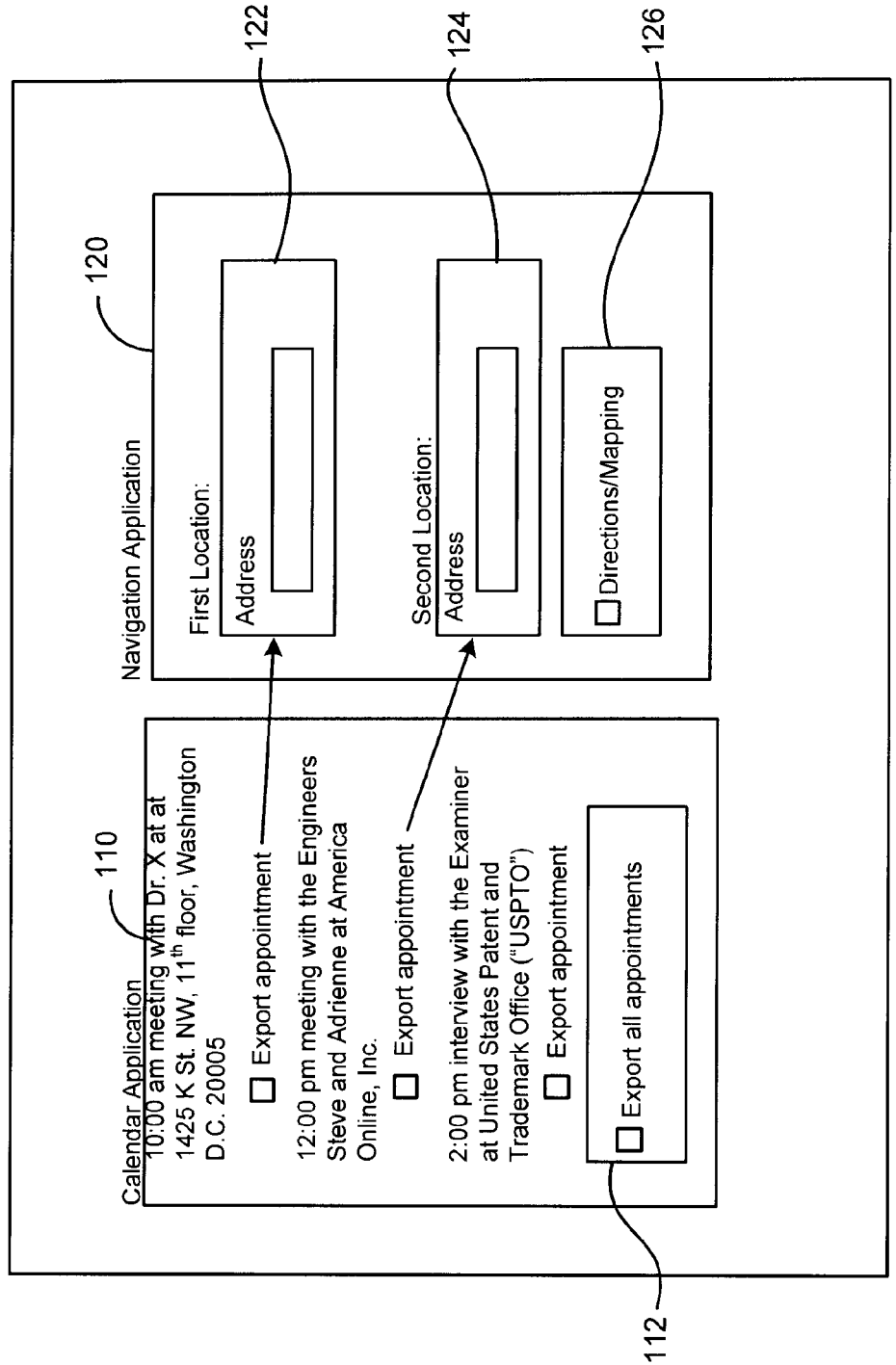
FIG. 1 illustrates an exemplary user interface that enables a user to export appointment information from a calendar application to a navigation application for generating directions to a location associated with the appointment information.

Generating directions to locations of appointments stored in a calendar application can be a complex undertaking. For example, a user who maintains a calendar with appointments that take place at various locations may find it difficult or cumbersome to identify a travel route through the locations of the user's appointments. Particularly, the user may find it time-consuming to manually look-up and print out directions for segments of a travel route before leaving, for example, the user's home or work place.

To minimize the user's burden in identifying a travel route through the locations of the user's appointments, concepts described herein effect communication of appointment information from a calendar application to a navigation application for generating a travel route through locations associated with the user's appointments.

The user is made able to communicate appointment information from the calendar application to the navigation application. In one implementation, to communicate the appointment information from the calendar application to the navigation application, the user accesses the calendar application and exports the appointment information from the calendar application to the navigation application. For example, the calendar application may include an export icon in association with the appointment information in the calendar application, such that user's selection of the export icon enables the user to export the appointment information from the calendar application to the navigation application. The navigation application identifies a location associated with the appointment information and generates directions to the location associated with the appointment information.

In another implementation, to communicate the appointment information from the calendar application to the navigation application, the user accesses the navigation application and imports the appointment information to the navigation application. More precisely, a navigation application includes an import option, manifested by an icon or "setting," which allows the user to import the appointment information from the calendar application to the navigation application. In one example, the user launches the navigation application, identifies a calendar application, and selects the import icon. In response to the user's selection of the import icon, the navigation application imports the appointment information from the identified calendar application into the navigation application. The navigation application identifies a location associated with the appointment information and generates directions to the location associated with the appointment information.

In yet another implementation, a user enters appointments in the user's calendar. The calendar may be stored online or locally on the user's computer or portable device (e.g., a mobile phone or a PDA). An appointment may include location information, and may be identified explicitly or implicitly. For example, explicit location information may include a precise address and time (e.g., a 2:00 pm appointment with patent counsel located at 1425 K St., NW, Washington, D.C., 20005). Implicit location information may include information that requires additional processing to derive a location. For example, an electronic message inviting a recipient to an appointment may include a sender's email address that in turn may be used to retrieve a user's profile in a related content/address book application (e.g., a 2:00 pm appointment with John, where "John" also appears in the recipient's address list in an entry that specifies John is located at 1425 K St., NW, Washington, D.C., 20005) or by referencing an external source, such as the Internet (e.g., a 3:00 pm interview with the Examiner at United States Patent and Trademark Office ("USPTO"), where the address for the USPTO may be obtained through an online database).

The user communicates the appointment information from the calendar application to a navigation application. In one implementation noted above, the user may select an export icon within the calendar application to export the appointment information to the navigation application. In another implementation also noted above, the user may select an import icon within the navigation application to import the appointment information to the navigation application from the calendar application. After receiving the appointment information, the navigation application identifies a location associated with the appointment information and generates directions and/or maps to the location associated with the appointment information. The directions may include appointment-to-appointment directions and/or efficient route directions. The appointment-to-appointment directions may include a route from a starting location through the locations of the appointments appearing in the calendar application. In one example, the appointment-to-appointment directions may include a route from a starting location through a location for each of the appointments in the user's calendar application (e.g., visiting the first appointment first, the second appointment second, the third appointment third, etc.). In another example, the starting location may include the current location of the user provided by the user's client device, for example, via a global positioning system ("GPS") operative in the client device.

The directions also may include efficient route directions. To determine the efficient route directions, the navigation application may change the priority of appointments and determine a travel commitment (e.g., a travel distance and/or travel time) for segments in the newly-calculated route. The navigation application then selects or enables selection of the route that has the shortest travel commitment as the efficient route and generates directions and/or maps for the user.

FIG. 1 illustrates an exemplary user interface ("UI") 100 that enables a user to export appointment information from a calendar application to a navigation application for generating directions to a location associated with the appointment information. In particular, the UI 100 enables the user to obtain directions and/or maps to the locations associated with various appointments in a calendar application, as described in more detail below with respect to FIGS. 2A-2D. The UI 100 may be displayed, for example, on an in-vehicle navigation system, a mobile device, such as a cellular phone or PDA, or other devices, such as a personal computer.

The UI 100 includes a calendar application interface 110 and a navigation application interface 120. The calendar application interface 110 includes appointment information for each of the appointments. As shown in FIG. 1, the appointment information includes "10:00 am meeting with Dr. X at 1425 K St. NW 11$^{th}$ floor, Washington, D.C. 20005," "12:00 pm meeting with the Engineers Steve and Adrienne at America Online, Inc.," and "2:00 pm interview with the Examiner at the USPTO."

The appointment information also includes an export icon that enables the user to export the appointment information to the navigation application. For example, as shown in FIG. 1, the calendar application interface 110 may enable the user to export the first appointment information and the second appointment information from the calendar application to the navigation application by selecting the first appointment export icon and the second appointment export icon. The calendar application also includes an export selection portion 112. The export selection portion 112 enables the user to export the appointment information from the calendar application to the navigation application. In one example, the export selection portion 112 enables the user to export all the appointment information from the calendar application to the navigation application. Upon selection of the export icons, the calendar application may interface with another intermediary application that identifies the location associated with each appointment and pulls each location into the corresponding location field in the navigation application interface 120. For example, by referencing the location field associated with the first appointment, the intermediary application identifies the first appointment's location and populates the first location field into the navigation application, accordingly, through the navigation application interface 120 or otherwise.

In another implementation, to accurately populate the location fields in the navigation application interface 120, the intermediary application identifies proximate words in each appointment and relates the proximate words to a specific address field appearing in the navigation application. For example, the intermediary application may look for words associated with street address, such as block number and populates the street address field appearing in the navigation application with that information. Similarly, the intermediary application searches for words relating to a city, a state, and a zip code and upon identifying such words, the intermediary application populates the corresponding fields in the navigation application.

The navigation application provides services for the calendar application. The navigation application interface 120 includes a first location portion 122, a second location portion 124, and a directions/mapping selection portion 126. The first location portion 122 enables the user to specify a first location, and the second location portion 124 enables the user to specify a second location that differs from the first location. In one implementation, the user specifies the first location and the second location by selecting the first appointment export icon and the second appointment export icon, respectively. The first appointment export icon relates to the first in time appointment of the user, and the second appointment export icon relates to the second in time appointment of the user. The selection of the first appointment export icon and the second appointment export icon exports the first appointment information and the second appointment information to the navigation application.

In one implementation, when two or more export icons are selected, the navigation application may need to realize and/or distinguish the appointment associated with the starting location from the appointment associated with the destination location. To do so, the navigation application may reference the time associated with each appointment. For example, the navigation application may consult with the calendar application to determine the time associated with the first appointment and the second appointment, and, based on the time associated with each appointment, the navigation application realizes that first appointment location should be used as the starting location and the second appointment location should be used as the destination location.

In a slightly different scenario, the navigation application includes location fields associated with each export icon and the location fields are arranged in an order such that the first location field acts as a starting location for the second location field and the second location field acts as a starting location for the third location field. In this manner, when two or more export icon are selected, the calendar application may populate the corresponding fields based on the timing of the appointments. For example, the calendar application populates the first appointment location in the first location field 122 and the second appointment location in the second location field 124. As such, the calendar application assists the navigation application to realize and/or distinguish between the starting location and the destination location when two or more export icons are selected.

Once the appointment information is communicated to the navigation application, the navigation application interface 120 enables the user to obtain directions and/or maps for an appointment via, for example, the user's selection of the directions/mapping selection portion 126. The directions/mapping selection portion 126 is configured to provide the user with different types of directions as described below in more detail with respect to FIG. 4.

Figure 2A:
FIG. 2A illustrates an exemplary user interface used to generate directions for a user traveling from a starting location to a first appointment location.
Figure 2C:
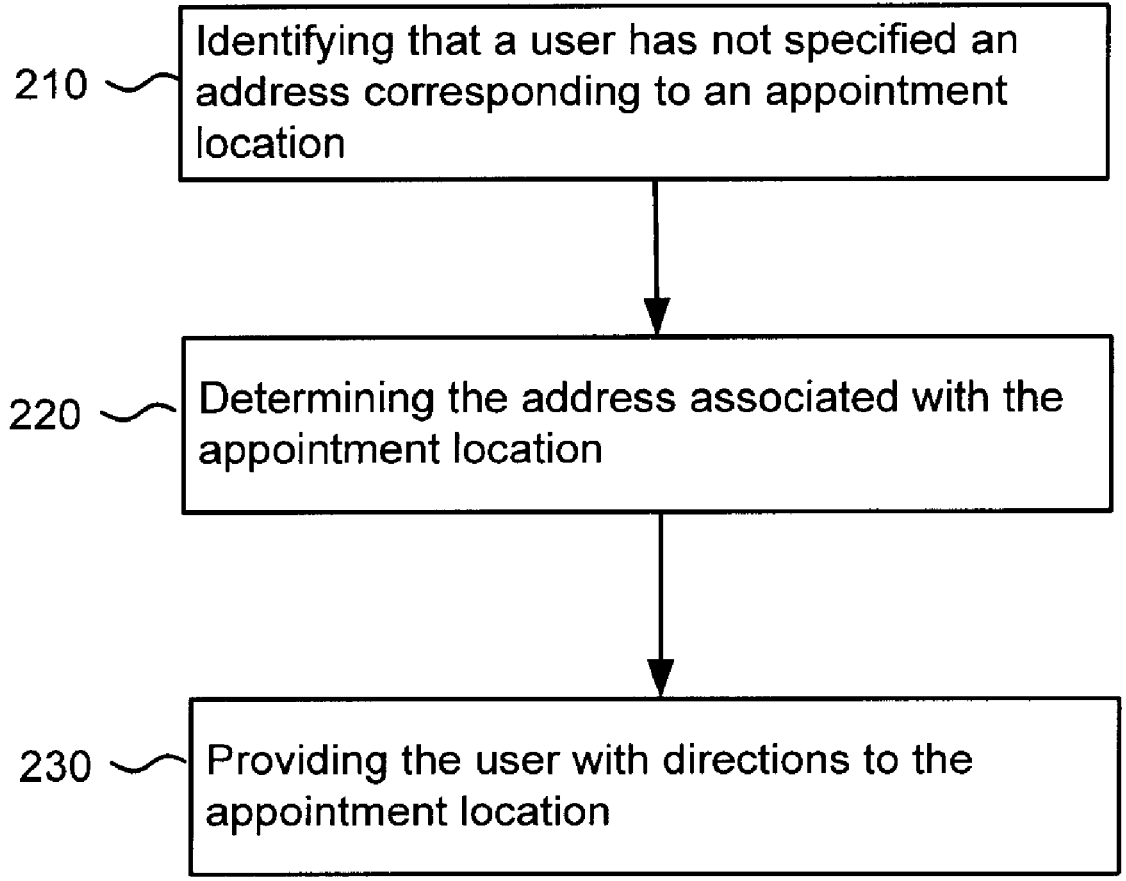
FIG. 2C illustrates an exemplary process used to determine an address associated with an appointment location.
Figure 2D:
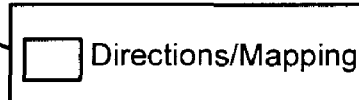
FIG. 2D illustrates an exemplary user interface used to generate directions for a user traveling from a second appointment location to a third appointment location.

FIGS. 2A-2B and 2D-2F illustrate exemplary UIs used to generate directions for different segments of the user's travel route. Specifically, FIG. 2A illustrates an exemplary UI 200A used to generate directions for a user traveling from a starting location to a first appointment location. FIG. 2B illustrates an exemplary UI 200B used to generate directions for a user traveling from a first appointment location to a second appointment location. FIG. 2D illustrates an exemplary UI 200D used to generate directions for a user traveling from a second appointment location to a third appointment location. FIG. 2E illustrates an exemplary UI 200E used to generate directions for a user traveling from a starting location through locations associated with the appointments in the calendar application. FIG. 2F illustrates an exemplary UI 200F used to give a user an option to obtain directions from a user-selected location to the user's next appointment location.

Referring to FIG. 2A, the UI 200A may be presented to the user in response to the user's selection of the first appointment export icon shown in FIG. 1. The UI 200A notes the user's current location and the first appointment location. The user's current location is at "Home." The user's current location may be input or it may be determined via, for example, a GPS receiver installed in the user's client device. The first appointment location is at "1425 K St. NW, 11$^{th}$ floor, Washington, D.C. 20005." The UI 200A also includes directions/mapping selection portion 212, enabling the user to obtain directions and/or maps to the first appointment location from the user's home.

In one implementation, the UI 200A is configured to be interactive. For example, the UI 200A enables the user to change the current location and the first appointment location by selecting "Home" and "1425 K St. NW, 11$^{th}$ floor, Washington, D.C. 20005." Selection of "Home" and "1425 K St. NW, 11$^{th}$ floor, Washington, D.C. 20005," may launch another UI, enabling the user to modify and/or change the specified addresses.

Referring to FIG. 2B, the UI 200B may be presented to the user in response to the user's selection of a first appointment export icon and a second appointment export icon as shown in FIG. 1. Alternatively, the UI 200B may be presented to the user in response to the expiration of the first appointment. In yet another example, the UI 200B may be presented to the user upon activation of a trigger by the user, indicating a desire to get directions to the next appointment location. For example, after attending the first appointment the user may click on a trigger icon to express a desire to see the next destination.

The UI 200B notes the user's current location and the second appointment location. The user's current location is at the first appointment location. The first appointment location appears to be at "1425 K St. NW, 11$^{th}$ floor, Washington, D.C. 20005." The second appointment location is at America Online, Inc. The navigation application realizes that the user has not specified an address for America online, Inc. and notifies the user via the UI 200B of the same. The navigation application may use an exemplary process 200C of FIG. 2C to determine the location associated with the appointment. Process 200C begins with the navigation application identifying that a user has not identified an address corresponding to the appointment location (e.g., America Online, Inc.) (210). To do so, in one implementation, the navigation application may reference the location field associated with the appointment in the calendaring application, and the navigation application determines that no address is provided for the appointment location if there is a lack of information in that field. Alternatively or additionally, the navigation application may also reference other fields associated with the appointment and may search for key words identifying an address. For example, the navigation application may search for a zip code, city, and/or state name to identify an address and in the absence of such information, the navigation application identifies a need for an address associated with the appointment location.

Upon identifying that the user has not specified an address for the appointment location, the navigation application attempts to identify an address for the appointment (220). To do so, the navigation application may solicit the user for such information. For example, the UI 200B may include an "address" icon, enabling the user to specify an address for America Online, Inc. The selection of the "address" icon may launch another UI, enabling the user to specify the address for America Online, Inc. The user may manually enter the address in the UI or may import the address into the UI from the user's profile. For example, the user's profile may include an entry for "America Online, Inc." that specifies the address for America Online, Inc. The profile may include the user's contact/address list. Alternatively, the navigation application may automatically determine the address for America Online, Inc. without having the user to interact with the UI 200B. For example, the navigation application may automatically obtain the address for America Online, Inc. from the user's profile.

Alternatively, the navigation application may access an online resource (e.g., Internet) to perform a web search or a database search to determine the address for America Online, Inc. In this manner and in one specific example, after performing the search, the navigation application may identify multiple addresses associated with the appointment location (e.g., America Online, Inc.). To ensure the correct address is used, the navigation application may present another UI to the user and request the user to select from among the multiple addresses associated with the appointment location. Upon identifying the address, the navigation application allows the user to obtain directions to the appointment location (230). To this end, the navigation application includes a directions/mapping selection portion 212 in the UI 200B, selection of which provides the user with directions and/or maps to the second appointment location from the first appointment location.

Referring to FIG. 2D, the UI 200D may be presented to the user in response to the user's selection of a second appointment export icon and a third appointment export icon shown in FIG. 1. Alternatively and as noted above with respect to the UI 200B, the UI 200D may be presented to the user in response to the expiration of the second appointment. In yet another implementation, the UI 200D may be presented upon activation of a trigger by the user, indicating a desire to get directions to the next appointment location. For example, after attending the second appointment the user may click on a trigger icon to express a desire to see the next destination.

In either case, the UI 200D is presented to the user, notifying the user that the user is on schedule. For example, the UI 200D may notify the user that the user is on time and has not deviated from the original route. Similar to the UI 200B, the UI 200D also includes a message notifying the user of the user's current location and the third appointment location and enables the user to obtain directions to the third appointment location. Referring to FIG. 2E, the UI 200E may be presented to the user in response to the user's selection of the export selection portion 112 shown in FIG. 1. As shown in FIG. 2E, the selection of the export selection portion 112 exports the user's appointments from the calendar application to the navigation application. The UI 200E notes the current location of the user as well as the locations associated with the appointments. If an appointment does not include a location, the UI 200E presents another UI (not shown), which requests the user to specify an address for that appointment as described above with respect to FIG. 2B. Alternatively, the navigation application automatically may determine an address for the appointment as also described above with respect to FIG. 2B. Similar to the UI 200A, the UI 200E also may be configured to be interactive, such that the user may change and/or modify the user's current location and the locations associated with the appointments.

The UI 200E also includes the directions/mapping selection portion 212, enabling the user to obtain directions for the user's entire day. The selection of the directions/mapping selection portion 212 enables the user to obtain appointment-to-appointment directions (e.g., from home to the first appointment location first, from the first appointment location to the second appointment location second, and from the second appointment location to the third appointment location third).

Referring to FIG. 2F, the UI 200F is similar to the UI 200B and may be presented to the user instead of or in addition to the UI 200B. The UI 200F differs from the UI 200B in that it includes a modified directions/mapping selection portion 212. The modified directions/mapping selection portion 212 provides the user with multiple options 212a and 212b. Option 212a provides the same functionality as the directions/mapping selection portion 212 of UI 200B. Option 212b gives the user an option of obtaining directions and/or maps to the second appointment location from another user-selected location. In particular, upon selection of the "address" link, the UI 200F causes another UI (not shown) to be presented to the user, in which the user can enter the starting location.

As such, the UI 200F gives the user an option to obtain directions from a user-selected location to the user's next appointment location at any point in time. For instance, if the user wishes to return home from the first appointment location before traveling to the second appointment location, the user can communicate such desire to the navigation application via the UI 200F and the navigation application provides the user with the directions from the user's home to the second appointment location.

Figure 3:
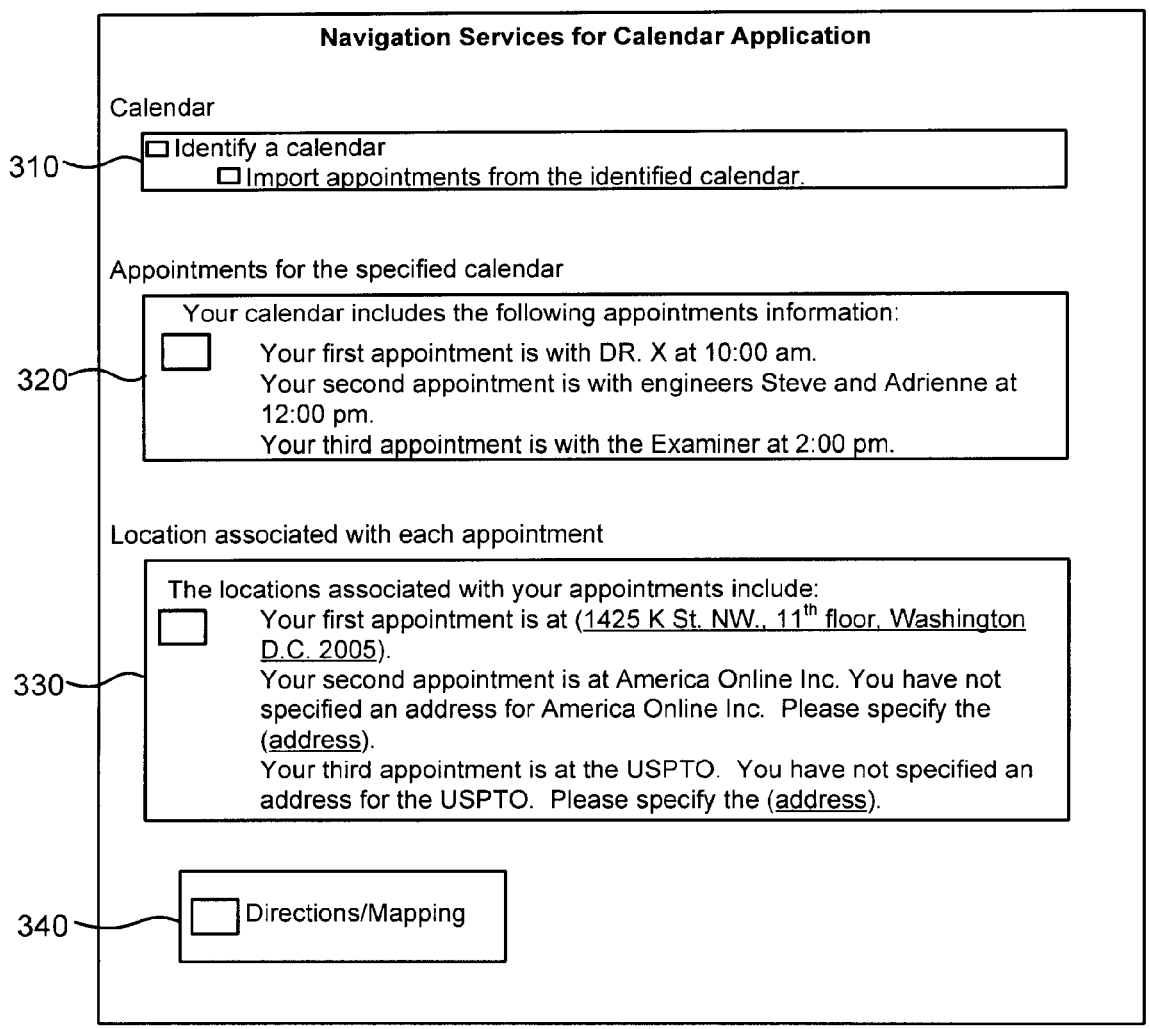
FIG. 3 illustrates an exemplary user interface that enables a user to import appointment information to a navigation application and obtain directions to a location associated with the appointment information.

FIG. 3 illustrates an exemplary UI 300 that enables a user to import appointment information to a navigation application and obtain directions to a location associated with the appointment information. The UI 300 includes a calendar selection portion 310, an appointment portion 320, a location portion 330, and a directions/mapping selection portion 340.

The calendar selection portion 310 enables the user to identify one or more calendar applications and import the appointment information from the identified one or more calendar applications to the navigation application. For example, the selection of the calendar selection portion 310 may launch another UI enabling the user to identify one or more calendar applications. The UI also includes an import icon, enabling the user to import the appointment information from the identified calendar application to the navigation application. In one example, the user may identify the calendar application shown in FIG. 1. In response, the navigation application accesses the calendar application and imports the appointment information from the calendar application to the navigation application. The navigation application displays the appointment information to the user in the appointment portion 320.

The appointment portion 320 displays the user's appointments. As shown in FIG. 3, the appointment portion 320 displays the user's first appointment, second appointment, and third appointment. The selection of appointment portion 320 enables the user to modify the imported appointments from the calendar application. For example, the user may change the order of the appointments and/or exclude or include additional appointments in the navigation application. The UI 300 also includes the location portion 330. The location portion 330 displays locations associated with appointments. If an appointment does not include a location, the location portion 330 includes an icon (e.g., an address icon) that generates an interface (not shown), allowing the user to specify an address for that appointment, as described above with respect to FIG. 2B. Alternatively, the navigation application may automatically determine the address for the appointment, as also described above with respect to FIG. 2B. In yet another implementation, to specify an address for an appointment location and/or to change an existing address associated with an appointment, the user may select the box associated with the location portion 330. In response to such selection, another UI (not shown) is presented to the user allowing the user to specify and/or change the locations associated with each appointment.

The UI 300 also includes the directions/mapping selection portion 340. The directions/mapping selection portion 340 enables the user to obtain directions and/or maps for the locations associated with appointments as described below in more detail with respect to FIG. 4.

Figure 4:
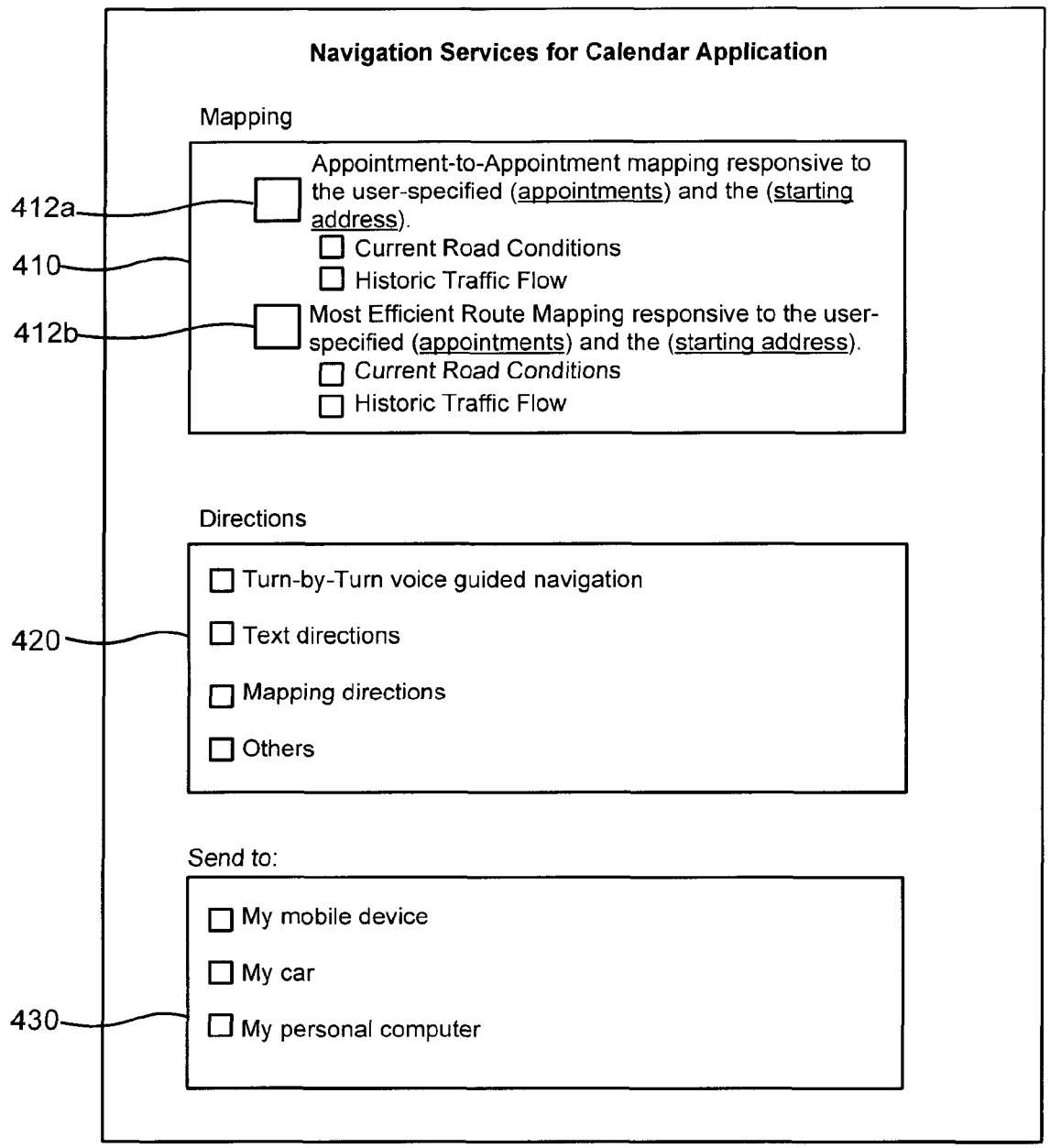
FIG. 4 illustrates an exemplary user interface used to specify how and what type of directions should be provided to a user.

FIG. 4 illustrates an exemplary UI 400 used to specify how and what type of directions should be provided to a user. The UI 400 may be presented to the user, for example, in response to the user's selection of the directions/mapping selection portion 340 shown in FIG. 3. The directions/mapping selection portion 340 includes a mapping selection portion 410, a directions selection portion 420, and a send-to-selection portion 430. The mapping selection portion 410 includes an appointment-to-appointment selectable icon 412a and an efficient route selectable icon 412b. The appointment-to-appointment selectable icon 412a enables the user to obtain directions and/or maps from one appointment to another appointment based on current road conditions and/or historic traffic flow, each identifying estimated driving time for the user. In one implementation, the user's selection of the appointment-to-appointment selectable icon 412a launches another UI, enabling the user to specify a starting location and a location associated with one or more appointments. For example, the user may specify the user's home as the starting location and may select the first appointment, the second appointment, and the third appointment from the calendar application interface 110 shown in FIG. 1. In response, the navigation application provides the user with directions and/or maps from the user's home to the first appointment location, from the first appointment location to the second appointment location, and from the second appointment location to the third appointment location.

The mapping selection portion 410 also includes the efficient route selectable icon 412b. The efficient route selectable icon 412b enables the user to obtain the efficient route for traveling through locations of the appointments based on the minimized travel commitment (e.g., minimized travel time and/or travel distance), the current road conditions, and/or the historic traffic flow. In one example, the user's selection of the efficient route selectable icon 412b enables the user to specify a starting location and a location associated with one or more appointments. The user may identify the user's home as the starting location and may identify the first appointment and the second appointment from the calendar application interface 110 shown in FIG. 1. Alternatively, the user may identify the first appointment and the second appointment from a "to do list" application and/or an efficient routing list that is part of the navigation application. The "to do list" application and/or the efficient routing list may include a list of appointments without having a particular order. Alternatively, the "to do list" application and/or the efficient routing list may include a list of appointments with a particular order, which can be disregarded according to the user's suggestion or otherwise.

Once the navigation application has the starting location information and the location information for the first and the second appointments, the navigation application identifies a route for traveling to the first appointment location and the second appointment location. As described in more detail below with respect to FIG. 5A, the selection of the most efficient route mapping may rearrange the order in which the first appointment and the second appointment are visited. For example, the navigation application may determine the travel commitment (e.g., travel time and/or travel distance) associated with the route traveling through the second appointment location and then first appointment location is less than the travel commitment associated with the route traveling through the first appointment location and then the second appointment location. In this scenario and as shown in FIG. 5A, the navigation application may change the order of the appointments, alert the user of the same, and provide the user with the directions and/or maps for the route traveling through the second appointment location, and then through the first appointment location.

The UI 400 also includes the directions selection portion 420. The directions selection portion 420 enables specification of different types of directions. For example, the directions selection portion 420 may be used to specify turn-by-turn voice guided navigation, text directions, mapping directions, and "other" types of directions, such as walking directions and/or public transportation directions.

The UI 400 also includes send-to-selection portion 430. The send-to-selection portion 430 enables specification of a device at which the user wishes to receive the directions. For example, the send-to-selection portion 430 enables the user to send directions to the user's mobile device (e.g., wireless phone and/or PDA), car, and/or personal computer.

Figure 5B:
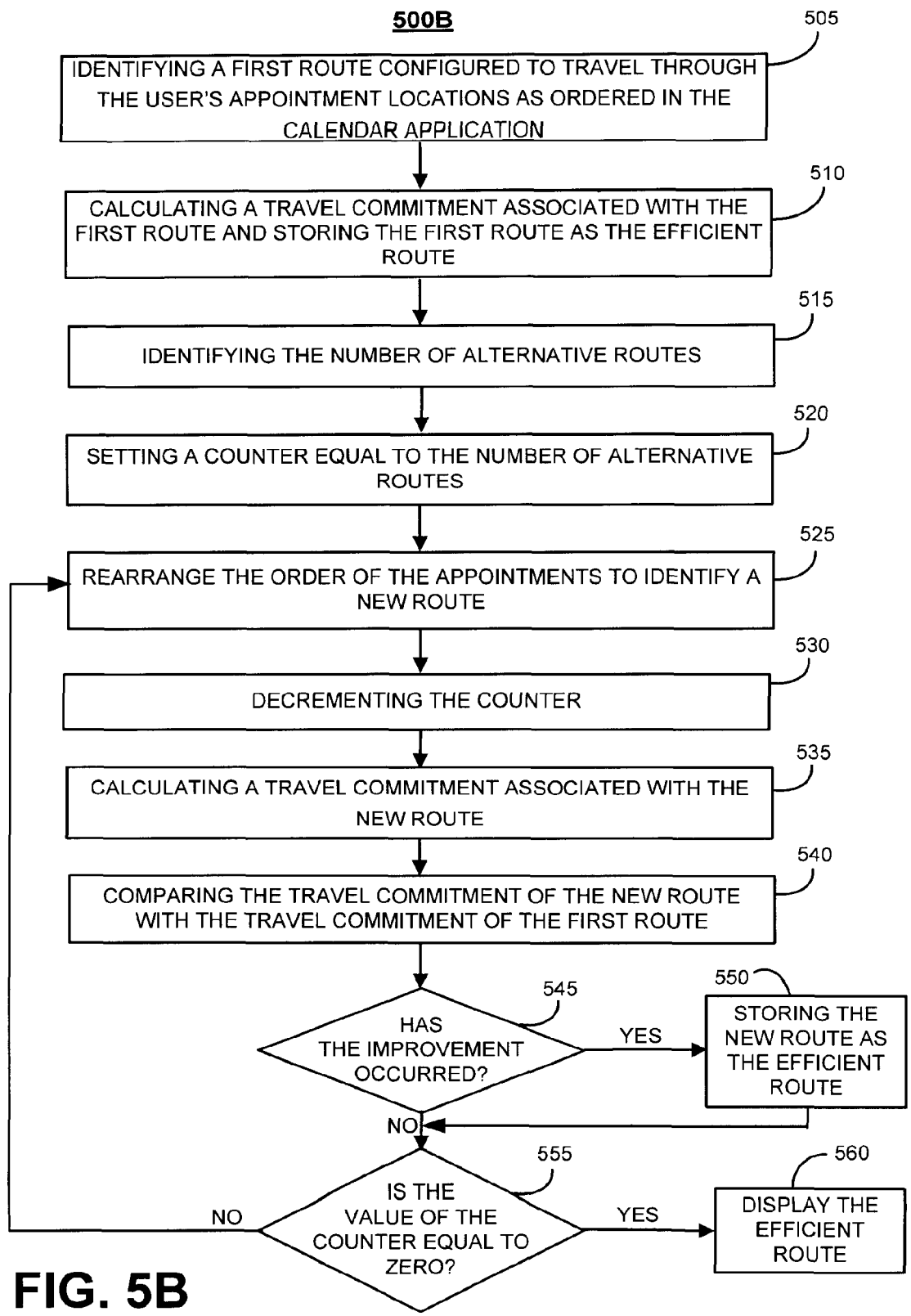
FIG. 5B illustrates an exemplary process that a navigation application uses to identify an efficient route in response to the user selection of efficient route mapping via the user interface illustrated in FIG. 5A.

FIG. 5A illustrates an exemplary UI 500A that may be presented to a user in response to the user's selection of the efficient route selectable icon 412b shown in FIG. 4. The UI 500A displays the efficient route to the user. The UI 500A includes a message indicating that the user has selected the "efficient route mapping" for a day's schedule or a segment thereof, and that the user has specified "home" as the starting location. The UI 500A displays the appointments to the user and the locations associated with the appointments. The UI 500A also displays an indication that use of an efficient route may rearrange the order of the appointments to identify a route with a minimum travel commitment (e.g., travel distance and/or travel time). And, the UI 500A enables the user to specify whether the user wishes to utilize the efficient route mapping. If the user decides to continue using the efficient route mapping, the navigation application determines the efficient route and displays it to the user.

In one implementation, the navigation application may employ an exemplary process 500B to determine the efficient route. Process 500B begins with the navigation application identifying a first route configured to travel through the user's appointment locations as they are intended and/or arranged in the calendar application (505). During this process, the navigation application may identify one or more appointment locations that do not include an address and, as such, the navigation application may cause a UI similar to the UI 200B to be presented to user in order to obtain the address associated with the appointment location. Alternatively, as described with respect to the UI 200B, the navigation application may identify the address associated with the appointment location without relying on the user.

In one specific example, where the user has two appointments appearing in the user's calendar, the first route may include a route configured to travel through the first appointment location, and then through the second appointment location. The navigation application calculates the travel commitment associated with the first route and stores the first route as the efficient route (510). The travel commitment may include travel time and/or travel distance. The navigation application identifies the number of the alternative routes (515) and sets a counter equal to the number of the alternative routes (520). In keeping with the previous example, where the user has two appointments in the user's calendar, there is one alternative route; thus, the value of the counter is equal to one.

The navigation application rearranges the order of the appointments to identify a new route (525). In keeping with the previous example, the new route includes a second route that is configured to travel through a second appointment location, and then through the first appointment location. The navigation application decrements the counter (530) and calculates the travel commitment associated with the new route (535). The navigation application compares the travel commitment of the new route with the travel commitment of the first route (540) and checks to determine whether an improvement has occurred in the travel commitment (545). If so (545, yes), the navigation application stores the new route as the efficient route (550) and checks to see whether the value of the counter is equal to zero (555), indicating all alternative routes have been considered. If so (555, yes), the navigation application displays the efficient route (e.g., the second route) to the user (560). Otherwise, the navigation application continues actions 525-560 until all the alternative routes are considered and displays to the user the efficient route having the minimum travel commitment.

Referring back to operational block (545), if the navigation application determines that there was no improvement in the travel commitment (545, no), the navigation application keeps the first route as the efficient route and moves on to check whether the value of the counter is equal to zero in operational block (555). If the counter value is zero (555, yes), indicating all alternative routes have been considered, the navigation application displays the efficient route (e.g., the first route) to the user (560). Otherwise, the navigation application continues actions 525-560 until all the alternative routes are considered and displays to the user the efficient route having the minimum travel commitment.

In keeping with the previous example and as shown in FIG. 5A, using the process 500B, the navigation application may be configured to determine that the second route is more efficient than the first route. As such, the navigation application may be configured to override the order of the original appointments and select the ordering based on the efficient route (e.g., the original second appointment becomes the user's first appointment and the original first appointment becomes the user's second appointment). The navigation application may communicate the efficient route to the calendar application, enabling the calendar application to reorder the appointment information based on the efficient route. Additionally, the navigation application may communicate the actual mapping information to the calendar application. This enables the user to have future access to the mapping information for each appointment without having to reference the navigation application. In particular, the future access to the calendar application illustrates to the user both the appointment information and the directions associated with the appointment information.

Similar to the UI 300, the UI 500A may be interactive, such that the user may change and/or modify the efficient route mapping option, the identified appointments, and the locations associated with the identified appointments, and the starting location. For instance, by modifying "all" the appointments to "some" appointments to only select a subset of appointments to which efficient route mapping algorithm may be applied.

In a slightly modified scenario, instead of presenting the efficient route with the minimized travel commitment to the user as suggested in UI 500A and the process 500B, the navigation application may identify the alternative routes and the travel commitment associated therewith and may present them to the user, so that the user can select from among them. In particular and as shown in FIG. 5C, the navigation application may use a UI 500C to present the alternative routes to the user. In keeping with the previous example, the UI 500C illustrates to the user a Route 1 with a 30 minute travel time and a Route 2 with a 20 minute travel time. Route 1 is configured to travel through the first appointment location, and then through the second appointment location. Route 2 is configured to travel through the second appointment location, and then through the first appointment location. The user may select Route 1 or Route 2 via selecting the box associated with those routes.

In another implementation, upon selection of the efficient route mapping, the navigation application may identify a route that is configured to travel through the appointment locations as ordered in the calendar application and also identify a convenient location associated with a user-identified point of interest. For example, if the user has indicated that the user wishes to visit a grocery store along the route, the navigation application identifies a convenient grocery store location for the user within the proximity of the route that is configured to travel through the appointment locations. To do so, in one implementation, the navigation application identifies a perimeter around the route and identifies locations associated with the grocery store within that perimeter. The navigation application then selects the location for the point of interest that appears to be closest to the route.

FIG. 6 illustrates an exemplary UI 600 that enables the user to set a reminder message and an alert message. The UI 600 includes a reminder selection portion 610 and an alert selection portion 620. The reminder selection portion 610 enables the user to instruct the navigation application to remind the user at a "specified time" in advance of an appointment time to leave a first location in order to arrive at the second appointment location on time. For example, the user's selection of the reminder selection portion 610 may launch another UI, enabling the user to set the "specified time." In one implementation, the "specified time" may take into account the travel time required to travel to the next location. For example, the user may request to be reminded about an appointment 10 minutes before the time the user should leave the user's present location to arrive at the appointment location on time. The reminder selection portion 610 also enables the user to specify the manner in which the reminder should be sent to the user. As shown in FIG. 6, the user may choose to receive the reminder via, for example, a telephone, an email, an instant message, and/or "other" options, such as SMS.

The UI 600 also includes the alert selection portion 620. As shown, the alert selection portion 620 includes four user-selectable alert options. The first alert option alerts the user if current road conditions change and may suggest an alternate route to the user that avoids problematic routes associated with the change in the road's condition. The second alert option alerts the user at "7:00 am every day" about conflicting appointments and may suggest possible options to help the user avoid the conflicting appointments. The third alert option alerts the user about a time period that is unscheduled between the user's appointments and may suggest an alternate schedule to help the user to more efficiently use the unscheduled time slot. The fourth alert option alerts the user if the user deviates from the previously calculated route and provides the user with new directions based on the user's present location. More particularly, the user's selection of the fourth alert option instructs the navigation application to update the calculated route based on real time information, such that a user deviating from the original route may receive an updated route (an updated effect on a calendar of appointments) to the user's next appointment location.

The UI 600 may be interactive, such that the user may change and/or modify the "specified time" for the reminder. For example, the user may change and/or modify the second alert option by selecting "7:00 am every day," which launches another UI, enabling the user to change and/or modify the second alert option.

FIG. 7 illustrates an exemplary UI 700 used to remind a user about the user's appointment. The UI 700 may be presented to the user, for example, in response to the user's selection of the reminder selection portion 610 in FIG. 6. The UI 700 includes a reminder message, reminding the user 30 minutes in advance of a time the user should leave the user's current location to arrive at the appointment location on time. In particular, the reminder message informs the user of the current time and the time and the location of the first appointment. In addition, the reminder message may include a link to the first appointment in the user's calendar. In particular, by selecting (e.g. "clicking on") the first appointment icon the navigation application displays the user's calendar, thus, allowing the user to view the first appointment and the details associated therewith. The reminder message also informs the user that under "current" conditions, it will take the user 30 minutes to arrive at the first appointment location and suggests the user leave at a certain time to arrive at the first appointment location on time. More specifically, the UI 700 notes to the user that the user should "leave by 9:30 am to arrive at the first appointment location on time." To this end, the reminder provides the user with a link associated with directions and/or maps to the first appointment location.

Figure 8A:
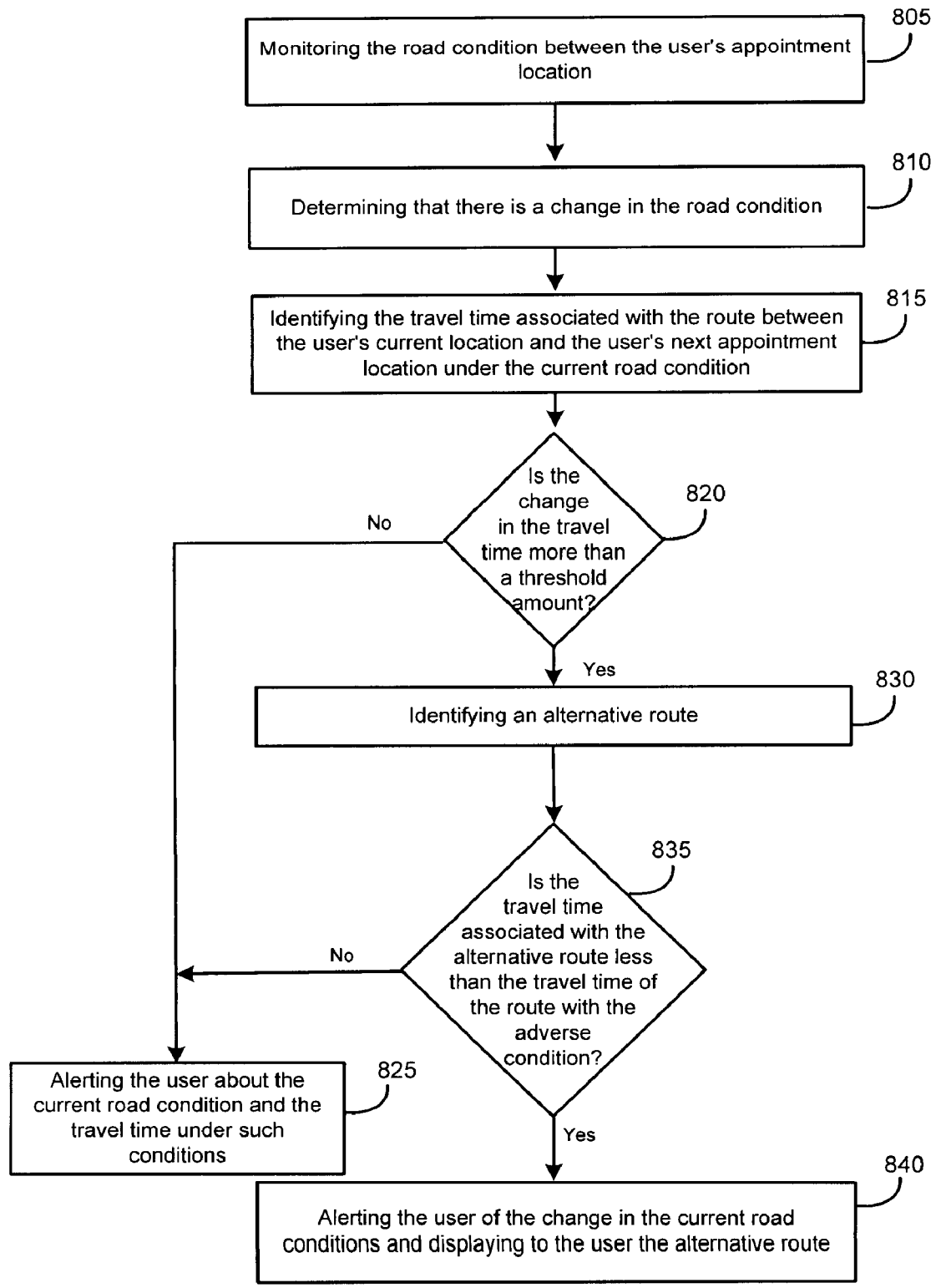
FIG. 8A illustrates an exemplary process that a navigation application uses to alert a user about a change in current road conditions.

FIG. 8A illustrates an exemplary process 800A that a navigation application uses to alert a user about a change in current road conditions. The navigation application may use process 800A, for example, in response to the user's selection of the first alert option in the alert selection portion 620 of FIG. 6. Process 800A begins with the navigation application monitoring the road conditions between the user's appointment locations (805). To do so, in one implementation, the navigation application regularly contacts a server that includes traffic data to obtain current road conditions between the user's appointments. In one example, to minimize the burden on the server initially, the navigation application may contact the server less frequently and, as it gets closer to the time the user has to leave the user's current location to arrive at the appointment location on time, the navigation application may contact the server more often to obtain more up to date information.

In either case, the navigation application may determine that there is a change in the road conditions (810). The change in the road conditions may include events such as traffic, accidents, rush hours, road blocks, and/or adverse weather conditions resulting in a slower recommended speed limit. The navigation application identifies the travel time associated with the route between the user's current location and the user's next appointment location under the current road conditions (815). The navigation application then compares the travel time under the changed road conditions with the travel time under normal conditions to determine if they differ by more than a threshold amount (820). If not, the navigation application alerts the user about the current road conditions and the travel time under such conditions (825). If the change in travel time is more than the threshold amount, the navigation application identifies an alternative route and the travel time associated therewith (830).

To identify the alternative route, the navigation application attempts to find a route that avoids the adverse events (e.g., accidents) resulting in the change in the road conditions for the previously calculated route. The navigation application checks to determine whether the travel time associated with the alternative route is less than the travel time associated with the route with the adverse conditions (835). If not, the navigation application alerts the user about the current road conditions and the travel time under such conditions (825). Otherwise, the navigation application alerts the user of the change in the road conditions and displays to the user the alternative route (840). To alert the user, the navigation application may display to the user a UI informing the user of the time, present location, and the adverse condition, and suggesting that the user take a different route to the user's next appointment location.

FIG. 8B illustrates an exemplary UI 800B the navigation application uses to alert a user about a change in current road conditions. The UI 800B informs the user of the present time (e.g., 1:00 pm), the user's present location (e.g., the second appointment location), and the user's next destination (e.g., the third appointment location). As shown in FIG. 8B, the UI 800B also informs the user that if the user were able to travel under normal conditions, the user could expect to arrive at the third appointment location in 30 minutes. However, problematic conditions adversely affect the ability of the user to achieve that estimated travel time. In particular, the alert message indicates that "[t]here is heavy traffic due to an accident on the I-495" and now it will take the user 1 hour to arrive at the third appointment location. In one implementation, to estimate the new travel time, the navigation application compares the travel time of the original route under the current road conditions with the travel time of an alternative route and suggests to the user the route with the minimum travel time. For example and as shown in FIG. 8B, the navigation application determines the alternative route has the minimum travel time (e.g., 1 hour) and suggests taking the alternative route. The navigation application also communicates to the user to leave immediately if the user wishes to arrive at the third appointment location on time. The UI 800B also enables the user to view the alternative route via, for example, selecting the "view" icon.

Figure 9A:
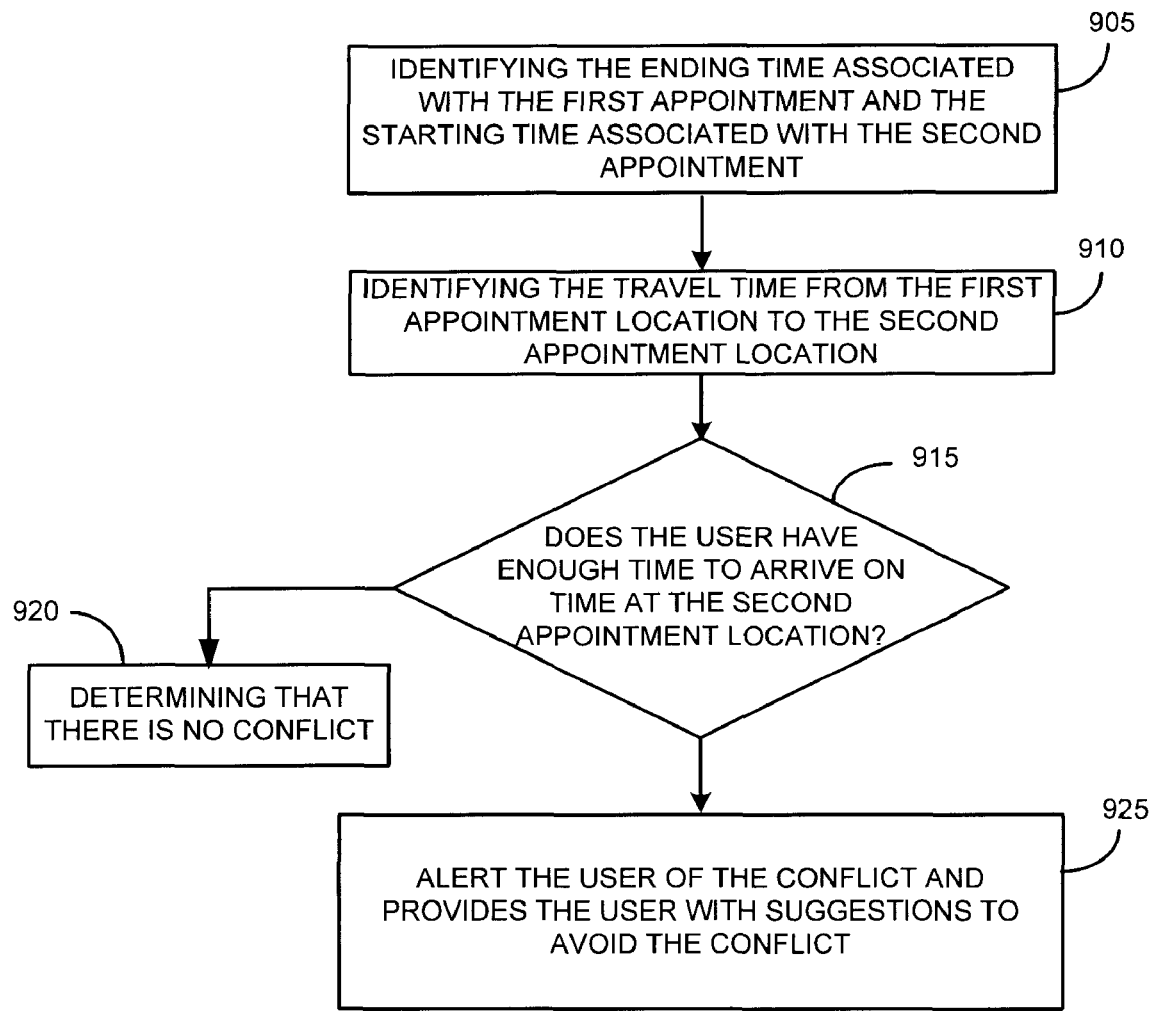
FIG. 9A illustrates an exemplary process that a navigation application uses to alert the user about conflicting appointments.

FIG. 9A illustrates an exemplary process 900A that the navigation application uses to alert the user about conflicting appointments. Process 900A may be used, for example, in response to the user's selection of the second alert option in the alert selection portion 620 of FIG. 6. Process 900A begins with the navigation application identifying the ending time associated with the first appointment and the starting time associated with the second appointment (905). For example, in keeping with the example shown in FIG. 1, the navigation application identifies that the first appointment is scheduled to end at 11:30 am and the second appointment is scheduled to start at 12:00 pm. The navigation application identifies the travel time from the first appointment location to the second appointment location (910).

Based on the identified travel time, the navigation application checks to determine whether the user has enough time to arrive on time at the second appointment location (915). If so, the navigation application determines that there is no conflict (920). In a slightly modified scenario, the navigation application determines the amount of time that remains unscheduled after subtracting the travel time from the first appointment location to the second appointment location and, if the remaining time is more than a threshold amount (e.g., 60 minutes), the navigation application informs the user of an unscheduled time period in the user's calendar. This implementation may allow the user to realize unscheduled time periods between the user's appointments and help the user to fill the empty time slots. This action may be performed, for example, in response to the user's selection of third alert option in the alert selection portion 620 of FIG. 6.

Based on the identified travel time, if the navigation application determines that the user does not have enough time to arrive at the second appointment location on time, the navigation application alerts the user of the conflicting appointments and provides the user with suggestions to avoid the conflict (925). For example, the suggestions may include suggesting that the user end the first appointment sooner than the scheduled ending time and/or to cancel or reschedule the first or the second appointment. The navigation application may present the alert and the suggestions to the user via a UI.

FIG. 9B illustrates an exemplary UI 900B the navigation application uses to alert a user about conflicting appointments. The UI 900 may be presented to the user automatically as a part of a regular morning update schedule, alerting the user if there are conflicting appointments in the user's calendar. The UI 900B notes that the first appointment at 10:00 am is supposed to last for 90 minutes and the second appointment is at 12:00 pm. The UI 900B also notes that "it takes 45 minutes to arrive at the third appointment location from the second appointment location." The UI 900B displays to the user several options to address this conflict. The first option enables the user to spend less time at the first appointment. The second option enables the user to cancel or reschedule the "second appointment". The third option enables the user to notify the navigation application that the user wishes to arrive late to the second appointment. The UI 900B may be interactive, such that the user is enabled to cancel or reschedule another appointment instead of the second appointment. For example, the user's selection of the "second appointment," may launch another UI, enabling the user to select an appointment to be canceled or rescheduled.

Figure 10A:
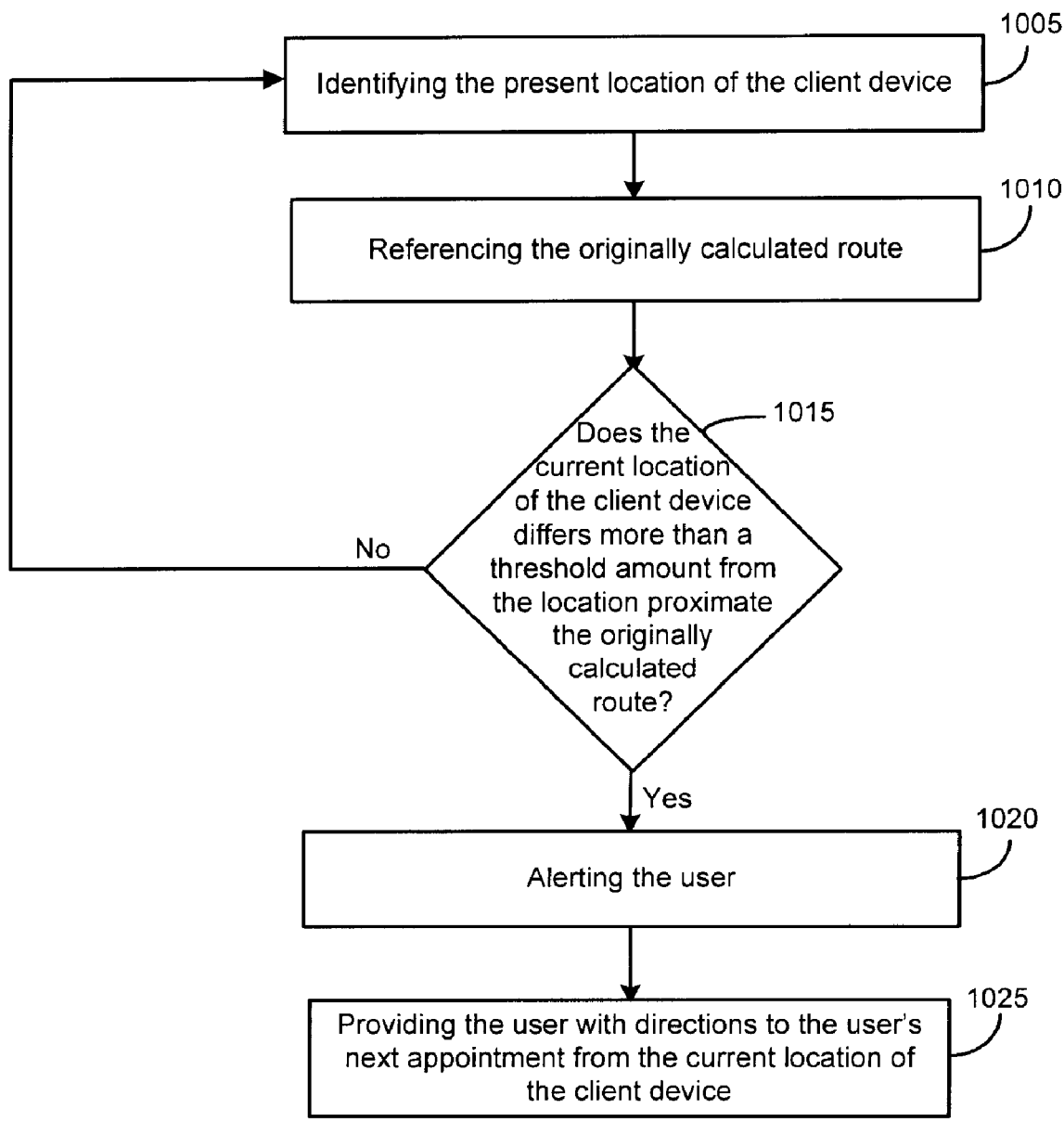
FIG. 10A illustrates an exemplary process that a navigation application uses to alert a user that the user has deviated from an original route.

FIG. 10A illustrates an exemplary process 1000A that the navigation applications uses to alert a user that the user has deviated from an original route. Process 1000A may be used, for example, in response to the user's selection of the fourth alert option in the alert selection portion 620 of FIG. 6. Process 1000A begins with the navigation application identifying the present location of the client device. In one implementation, the navigation application automatically determines the present location of the user using location providing technology implemented in the user's client device. If the client device is equipped with multiple location providing technologies, the navigation application may use the technology that provides the most accurate information about the present location.

In one example, the client device may include a mobile device that is GPS-enabled, and the host may automatically determine the present location of the client device based on the GPS position of the client device. In another example, the present location of the client device may be automatically determined by registering the client device with a host (e.g., a Session Initiation Protocol ("SIP")) server. The client device may provide information to the host that is used to derive location information. For example, the host may derive location information based on how the client device is accessing the network (e.g., as identified by source IP address or another packet identifier).

In yet another alternative, the present location of the client device may be automatically determined from the user's profile. For example, the user may have associated profile or contact information indicating a predetermined home and/or office location. In one specific example, the user of a client office computer may have previously stored the location of the user's office in the user's profile. Thus, the navigation application may use the user's profile to determine the office location.

Upon determining the current location, the navigation application references the originally calculated route (1010) and checks to determine whether the current location of the client device differs more than a threshold amount from the location proximate to the originally calculated route (1015). In one example, the threshold may be 1 mile from the originally calculated route. If the current location of the client device differs more than the threshold amount from the originally calculated route, the navigation application alerts the user (1020) and provides the user with directions to the user's next appointment location from the current location of the client device (1025). The navigation application may use a UI, such as the one shown in FIG. 10B, to alert the user and provide the user with updated directions. As described further below with respect to FIG. 10B, the alert message also informs the user of the time and location of the user's next appointment and the travel time to the next appointment location based on the user's present location.

FIG. 10B illustrates an exemplary UI 1000B that may be used to alert a user that the user has deviated from an original route or that an unscheduled time period has been found in the user's calendar. The UI 1000B includes an alert message, noting the user has deviated from the route calculated originally. In particular, the alert message notes to the user that "it is currently 11:00 am, and it seems you have deviated from the original route. You are presently at a McDonald's restaurant at 1100 F St., NW, Washington D.C. 20005."

The alert message also informs the user of the time and location of the user's next appointment (e.g., the second appointment) and the travel time to the next appointment location based on the present location of the user. As shown in FIG. 10B, if the user were able to travel under normal conditions, the user may expect to arrive at the second appointment location in 10 minutes. Thus, the navigation application notes the user has 50 minutes of unscheduled time and prompts the user to request more information, such as, for example, whether the user wishes to spend more time at the preceding or subsequent appointments, to stop at another place (e.g., a gas station), to start traveling toward the next appointment, or to do "other" activities, such as to go to a coffee shop and/or a grocery store. In particular, the UI 1000B includes an option that allows a user to search for a particular point of interest (e.g., a coffee shop) near a user-identified destination. For example, by selecting (e.g., "clicking on") the "destination" link, the UI 1000B generates another UI that allows the user to specify an address for the coffee shop. As such, this option allows the user to perform a more limited geographical search for a particular point of interest.

Figure 11:
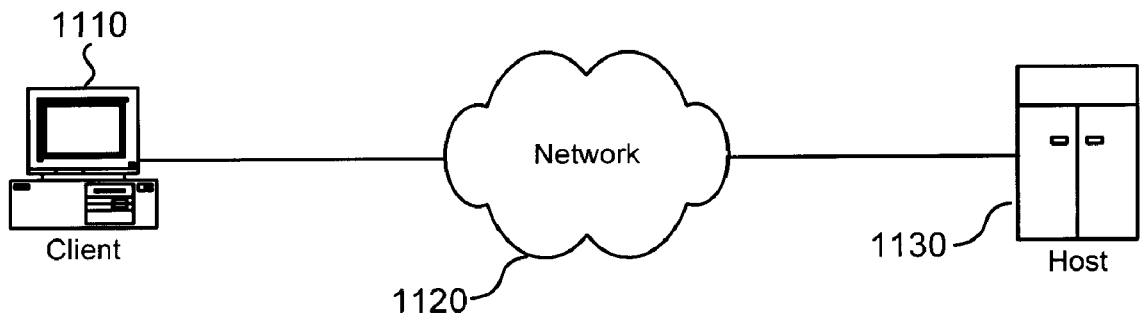
FIG. 11 illustrates a communication system enabling exchange of data between a client device and a host.

FIG. 11 illustrates a communication system 1100 enabling exchange of data between a client device 1110 and a host 1130 through a delivery network 1120. In one implementation, the client device 1110 is configured to include a user's calendar application and the host 1130 is configured to include a navigation application. The communication system 100 enables the client device 1110 to communicate appointment information to the host 1130 and receive directions and/or maps to a location associated with the appointment information.

Each of the client device 1110 and the host 1130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client device 1110 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client device 1110 or the host 1130.

The client device 1110 may include one or more devices capable of accessing content on the host 1130. The client device 1110 may include a general-purpose computer (e.g., a personal computer ("PC")) capable of responding to and executing instructions in a defined manner, a workstation, a notebook computer, a Personal Digital Assistant ("PDA"), a wireless phone, a component, other equipment, or some combination of these items that is capable of responding to and executing instructions.

In one implementation, the client device 1110 includes one or more information retrieval software applications (e.g., a browser, a mail application, an instant messaging client, an Internet service provider client, a media player, a mobile location based services client, a mobile mapping and/or navigation client, or calendar application or other integrated client) capable of receiving one or more data units. The information retrieval applications run on a general-purpose operating system and a hardware platform that includes a general-purpose processor and specialized hardware for graphics, communications and/or other capabilities. In another implementation, the client device 1110 includes a wireless telephone running a micro-browser application on a reduced operating system with general purpose and specialized hardware capable of operating in mobile environments.

The client device 1110 may be configured to enable a user to communicate appointment information to the navigation application. To do so, the client device 1110 is configured to render an export icon in the calendar application interface and enable the user to select the export icon. The client device 1110 exports the appointment information to the navigation application based on the user's selection of the export icon. The client device 1110 also is configured to display a reminder to the user of the calendar application at a specified time in advance of an appointment time to leave a first location to arrive at the appointment location on time based on current road conditions and/or historic traffic flow. The client device 1110 also is configured to display directions and/or maps to the user. For example, the client device 1110 may be configured to display a map, information regarding travel time and distance, and/or directions to the appointment location. The dine device 1110 also may be configured to provide turn-by-turn voice guided navigation to the appointments location.

The network 1120 includes hardware and/or software capable of enabling direct or indirect communications between the client device 1110 and the host 1130. As such, the network 1120 includes a direct link between the client device 1110 and the host 1130, or it includes one or more networks or subnetworks between them (not shown). Each network or subnetwork includes, for example, a wired or wireless data pathway capable of carrying and receiving data. Examples of the delivery network include the Internet, the World Wide Web, a Wide Area Network ("WAN"), a Local Area Network ("LAN"), analog or digital wired and wireless telephone networks, radio, television, cable, satellite, and/or any other delivery mechanism for carrying data.

The host 1130 includes a general-purpose computer having a central processor unit (CPU), and memory/storage devices that store data and various programs such as an operating system and one or more application programs. Other examples of the host 1130 include a workstation, a server, a special purpose device or component, a broadcast system, other equipment, or some combination thereof capable of responding to and executing instructions in a defined manner.

The host 1130 may include a host operated by an Online Service Provider that provides searching services to subscribers. Alternatively or additionally, the host 1130 includes a mapping service provider. Alternatively or additionally, the host 1130 includes a mobile device, such as a cellular-phone or an in-vehicle navigation system. The host 1130 may be configured to provide navigation services. As a part of operating the navigation application, the host 1130 is configured to receive the appointment information from the calendar application. In one implementation, the host 1130 receives the appointment information from the calendar application based on the user's selection of the export icon displayed within the calendar application interface 110 as described above. In another implementation, the host 1130 receives the appointment information from the calendar application based on the user's selection of an import icon displayed within the navigation application interface 120. In particular, the host 1130 enables the user to activate the navigation application and identify the calendar application. The host 1130 renders the import icon in the navigation application and enables the user to select the import icon. The host 1130 imports the appointment information from the identified calendar application to the navigation application based on the user's selection of the import icon.

The host 1130 may be configured to provide directions and/or maps services to the user. In one example, the host 1130 is configured to generate maps, information regarding travel time, and/or distance to the appointment location. The host 1130 may be configured to enable selection of different types of directions. For example, the host 1130 may be configured to enable turn-by-turn voice guided navigation, mapping directions, text directions, and/or "other" types of directions, such as walking directions or public transportation directions. The host 1130 may be configured to send this information to the user's mobile device, the user's automobile, and/or the user's computer.

In one implementation, the client device 1110 alone may perform the functions described above. For example, the client device 1110 may perform the functions described above by referencing an internal navigation application. In another implementation, the host 1130 alone may perform the functions described above. For example, the host 1130 may perform the functions described above by referencing an internal calendar application. In yet another implementation, the client device 1110 and the host 1130 both may perform some or all of the functions described above. For example, the client device 1110 may include a wireless phone and the host 1130 may include an in-vehicle navigation system. The wireless phone may include the user's calendar and the wireless phone may communicate with the in-vehicle navigation system to export the appointment information from the calendar application to the in-vehicle navigation system. In response, the navigation system provides the user with directions to the user's appointments. The navigation system may provide this information on its own display and/or on the display of the wireless phone.

Figure 12:
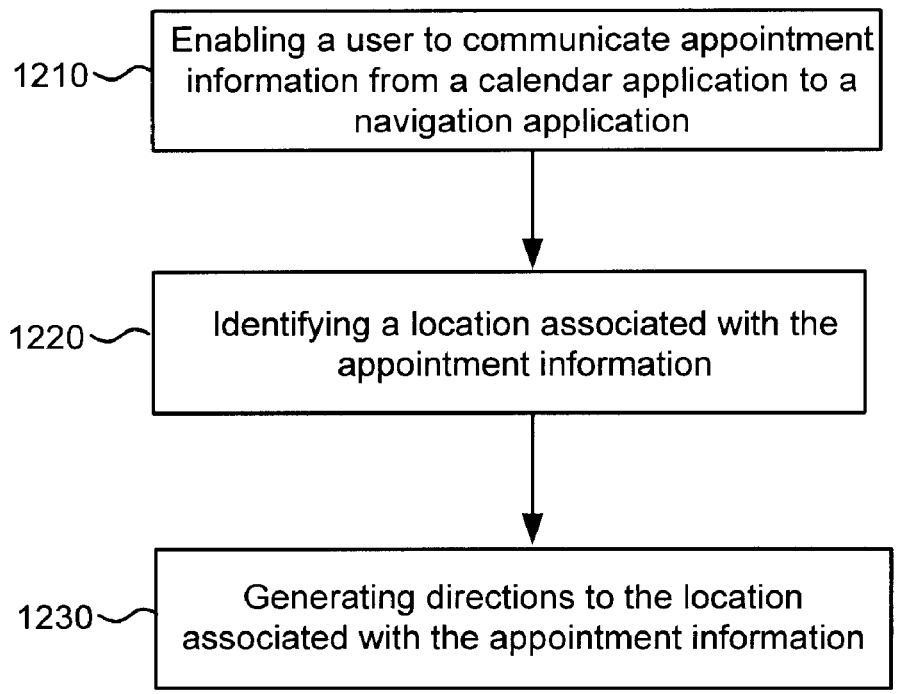
FIG. 12 illustrates a flow chart of an exemplary process by which a calendar application may interact with a navigation application to generate directions and/or maps to multiple locations associated with various appointments specified in a user's calendar.

FIG. 12 illustrates a flow chart 1200 of an exemplary process by which a calendar application may interact with a navigation application to generate directions and/or maps to multiple locations associated with various appointments specified in a user's calendar. Initially, the user is enabled to communicate appointment information from the calendar application to the navigation application (1210). In one implementation, enabling communication of the appointment information from the calendar application to the navigation application includes rendering an export icon in the calendar application interface 110 and exporting the appointment information to the navigation application based on the user's selection of the export icon. Alternatively, enabling the user to communicate the appointment information from the calendar application to the navigation application includes rendering an import icon in the navigation application interface 120 and enabling the user to select the import icon. The navigation application imports the appointment information from the calendar application to the navigation application based on the user's selection of the import icon.

The navigation application identifies a location associated with the appointment information (1220). The navigation application may identify the location associated with the appointment information from the calendar application or from the user's profile. For example, the user's profile may include an entry for the appointment. Alternatively, the navigation application may identify the location information associated with the appointment through a web search. After identifying the location information associated with the appointment, the navigation application generates directions to the location associated with the appointment (1230). Generating the directions to the location associated with the appointment may include generating appointment-to-appointment directions. The appointment-to-appointment directions include directions from a first location to an appointment location. The first location may include the user's starting or current location. The appointment-to-appointment directions also may include directions from a first appointment location to a second appointment location.

Alternatively, generating the directions to the appointment location includes generating efficient route directions. Generating the efficient route directions includes determining the efficient route for multiple appointments having an arbitrary order. To determine the efficient route, the navigation application may change the priority of appointments and determine a travel commitment (e.g., a travel distance and/or travel time) for the route based on the new arrangement. In one implementation, the navigation application then chooses the route that has the shortest travel commitment as the efficient route and generates directions and/or maps for the user.

Other implementations also are contemplated. For example, a UI may be configured to enable a client device to provide the above described functions automatically, without the user having to select an export icon and/or an import icon to communicate appointment information to the navigation application. More precisely, the client device may be made able to automatically communicate the appointment information from the calendar application to the navigation application as a part of a regular morning update schedule and provide the user with directions and/or maps to the appointments' locations. In one specific example, the navigation application is configured to automatically obtain the appointment information from the calendar application. The navigation application also is configured to automatically determine the user's current location using a location-based technology such as GPS. Alternatively, the navigation application may be configured to request that the user specifies the user's current location. Once the navigation application has the user's current location and the appointments' locations, the navigation application generates appointment-to-appointment directions and/or efficient route directions, as described above.

Alternatively, the navigation application may identify a route that is not efficient. For example, the navigation application may identify an inefficient route due to the user's preference (e.g., the user may prefer some of the appointments to be visited in a particular order, which may result in increased travel time). Once the route is identified, the navigation application may automatically generate turn-by-turn voice guided directions in response to the user's default setting and may communicate the directions to the user's mobile device again as a part of user's default setting. A user may be enabled to change a default setting.

Instead of or in addition to providing the user with directions and/or maps as a part of a regular morning update schedule, the client device may be configured to provide the user with directions and/or maps at a specific time in advance of an appointment. The specific time in advance of the appointment may take into account the travel time to the appointment location, including traffic delays as well as the user's method of travel (e.g., public transportation, personal car, or walking). For example, the client device is configured to provide the user with directions and/or maps 30 minutes before the user has to leave the user's current location to arrive at the appointment location on time. The client device also may be configured to provide the user with turn-by-turn voice guided navigations. The client device may request that the user specifies when the user is ready to receive the turn-by-turn voice guided navigations and provide the user with the turn-by-turn voice guided navigations when the user is ready.

In another example, a user is made able to use "one-click mapping" to generate directions and/or maps to locations associated with various appointments. To enable the user to use "one-click mapping," a UI is configured to enable the user to obtain directions and/or maps in response to the user's selection of the export icon and/or the import icon. Once the user selects the export icon and/or the import icon, the navigation application provides the user with directions and/or maps to the locations associated with the appointments without the user having to select the directions/mapping selection portion as shown, for example, in FIGS. 2A-2D. Additionally or alternatively, to export appointment information to the navigation application, the user may use "drag and drop" operation. In particular, the user may drag, from the calendar application, the particular appointments for which the user would like to obtain directions and drops the appointments in the navigation application. In another implementation, the user may use the "drag and drop" operation to drag, from the navigation application, the directions and/or maps associated with an appointment and drop them within the calendar application.

In still another example, the technology described by the present application identifies a travel time between the user's appointments (e.g., first and second appointments) and places a hold on the user's calendar to account for such travel time. As such, the user may be presented with an option of selecting to travel immediately following the first appointment or just prior to the second appointment. Furthermore, in the absence of sufficient time between the first and second appointment for accommodating such travel time, the user is provided with an alert message at the time of scheduling the first and/or the second appointment, informing the user of the same. The alert message may also provide the user with several options to allow the user (or a person to whom the user delegates the task of keeping the user's calendar) to account for such a conflict. For example, the alert message may send the user a note to indicate the anticipated need to leave the first appointment earlier than its scheduled ending time or arriving at the second appointment later than its scheduled starting time. Alternatively, the alert message may provide the user with an option to reschedule the first and/or the second appointment. To this end, the navigation and/or calendaring application may attempt to identify the availability of the member participants of the first appointment and the second appointment for rescheduling either of the first and/or second appointments. In this manner, the user is presented with several options to resolve the conflict (e.g., absence of enough travel time) between the first and second appointments.

In another example, upon identifying that there is an unscheduled time period in the user's calendar, the navigation application informs the user of such an unscheduled time period and allows a user to search for a location to spend time at during the identified gap between the user's appointments. In one example, the navigation application presents a UI to the user that allows the user to specify the point of interest (e.g., a coffee shop or a book store) and the location associated therewith. In response, the user identifies the point of interest and the location associated therewith to the navigation application. The user may provide the navigation application with a specific address associated with the point of interest. Alternatively, the user may provide the navigation application with a geographic area within which the point of interest should be located. In either case, this implementation allows the user to perform a geographically limited search for a particular point of interest to fill the gap between the user's appointments.

In still another example, a user is enabled to view the user's calendar on the user's client device (e.g., cellular phone and/or PDA). The user's calendar may include a navigation icon, enabling the user to switch from a calendar mode to a navigation mode. The navigation mode provides the user with directions and/or maps to the user's first appointment. To get to the next appointment, the navigation application may return to the calendar application to obtain appointment information and then provide navigation to the next appointment location.

In yet another example, a user may receive a reminder about the user's appointments. The reminder takes into account current road conditions, travel time, and the user's method of travel. The current road conditions include traffic and/or accidents. To determine the current road conditions, the client device may contact a server that includes traffic data. To provide the user with more accurate information, the client device may contact the server more often as it gets closer to the time the user has to leave the user's current location to arrive at the appointment location on time, thereby minimizing the burden on the server initially.

In yet another implementation, the client device includes a personal computer ("PC"), with a navigation application client. The navigation application client on the PC communicates with another navigation application client on a mobile device (e.g., a cellular phone and/or PDA) through a server at the back end. For example, the navigation application client on the PC may provide the mobile device with mapping and/or directions to the appointment locations. In response, the navigation application at the mobile device provides the user with the turn-by-turn voice guided directions to the appointment locations.

In yet another implementation, the navigation application includes a location based services ("LBS") application and/or other applications that include navigation capability. The LBS application obtains calendar information, via for example, selection of the import icon or the export icon described above. The LBS application may be part of the user's PC and may communicate this information to the LBS application of the user's mobile device. The LBS application on the user's mobile device may present the calendar information to the user in a format similar to a calendar UI that is recognizable by the user. The LBS application also includes navigation functionality and enables the user to obtain directions/maps to the appointment locations.

Although some operations described as being performed by a client device, a host and/or combinations of the client device and the host also may perform these operations.

What is claimed is:

1. A method for providing directions to an appointment location appearing in a calendar application, the method comprising:
   rendering a transferring control as a tool within an interface associated with a calendar application, the transferring control structured and arranged to communicate appointment information from the calendar application to the navigation application;
   enabling a user to activate the transferring control;
   enabling, at a first time, the user to identify a first appointment within the calendaring application, the first appointment having a designated appointment time;
   receiving, at the first time, a transferring instruction from the transferring control indicating that the user has selected to transfer the first appointment to the navigation application;
   activating, at a second time, a navigation application on a user device, the navigation application being configured in a first mode with a destination that is not related to the first appointment time;
   accessing, at the second time and within the navigation application, information related to the first appointment;
   comparing the second time to the designated appointment time for the first appointment using the location of the user device;
   determining, based on comparing the second time to the designated appointment time for the first appointment, that a scheduling conflict exists, the scheduling conflict indicating that insufficient time remains for the user to travel to the first appointment;
   determining that use of an alternative scheduling arrangement alleviates the scheduling conflict through the use of route mapping that switches the first appointment with a second appointment;
   prompting, within the navigation application, the user with an alert message identifying the scheduling conflict and an indication that the alternative scheduling arrangement alleviates the scheduling conflict;
   receiving, in response to prompting the user with the alert message, a response message from the user;
   routing the response message to the calendaring application from the navigation application;
   accessing the alternative scheduling arrangement; and
   updating the calendaring application to reflect user instructions from the response message using the alternative scheduling arrangement.

2. The method of claim 1 wherein rendering the transferring control includes rendering the transferring control within the interface associated with the calendar application, the transferring control structured and arranged to export the appointment information from the calendar application to the navigation application.

3. The method of claim 2 wherein transferring includes exporting the identifier to the navigation application, wherein the identifier includes a description of the appointment and the location associated therewith.

4. The method of claim 1 wherein rendering the transferring control includes rendering the transferring control within the interface associated with the navigation application, the transferring control structured and arranged to import the appointment information from the calendar application to the navigation application.

5. The method of claim 4 wherein enabling the user to activate the transferring control further includes:
   enabling the user to access the navigation application;
   enabling the user to identify the calendar application to the navigation application; and
   enabling the user to select the transferring control within the interface associated with the navigation application.

6. The method of claim 5 wherein transferring includes importing the identifier to the navigation application, wherein the identifier includes a description of the appointment and the location associated therewith.

7. The method of claim 6 wherein importing further includes:
   accessing, via the navigation application, the user-identified calendar application;
   accessing, within the calendar application, the identifier of the appointment; and
   pulling the identifier into the navigation application.

8. The method of claim 7 further comprising displaying a notification window before an appointment time, the notification window structured and arranged to remind the user about the appointment and wherein rendering the transferring control includes rendering the transferring control within the notification window, such that selection of the transferring control results in transfer of the appointment description and the location associated with the appointment to the navigation application.

9. The method of claim 8 wherein displaying the notification window includes displaying the notification window in a specified time in advance of the appointment time.

10. The method of claim 9 wherein displaying the notification window in the specified time in advance of the appointment time further includes:
   identifying a travel time to the appointment location from the starting location; and
   displaying the notification window at a specified time that precedes the appointment time by at least the travel time to the appointment location.

11. The method of claim 7 wherein transferring includes transferring the identifier to the navigation application in a specified time in advance of an appointment time, wherein the identifier includes a description of the appointment and the location associated therewith.

12. The method of claim 7 wherein generating the directions includes generating a travel route from a first location to the location associated with the appointment.

13. The method of claim 1 wherein generating the directions includes:
   determining an efficient route for multiple appointments having an arbitrary order;
   arranging the order of the multiple appointments based on the efficient route; and
   generating directions through locations associated with the multiple appointments based on the arranged order of the multiple appointments.

14. The method of claim 1 wherein updating the calendaring application to reflect user instructions from the response message includes adjusting a schedule for an existing activity to end sooner.

15. The method of claim 1 wherein updating the calendaring application to reflect user instructions from the response message includes rescheduling the first appointment.

16. The method of claim 1 wherein updating the calendaring application to reflect user instructions from the response message includes canceling the first appointment.

* * * * *